United States Patent
Shapira et al.

(10) Patent No.: US 9,911,232 B2
(45) Date of Patent: Mar. 6, 2018

(54) MOLDING AND ANCHORING PHYSICALLY CONSTRAINED VIRTUAL ENVIRONMENTS TO REAL-WORLD ENVIRONMENTS

(71) Applicant: Microsoft Technology Licensing, LLC, Redmond, WA (US)

(72) Inventors: Lior Shapira, Redmond, WA (US); Daniel Freedman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 14/633,661

(22) Filed: Feb. 27, 2015

(65) Prior Publication Data
US 2016/0253842 A1 Sep. 1, 2016

(51) Int. Cl.
*G06T 19/00* (2011.01)
*G06F 3/01* (2006.01)
(Continued)

(52) U.S. Cl.
CPC ............ *G06T 19/006* (2013.01); *A63F 13/65* (2014.09); *G02B 27/017* (2013.01); *G06F 3/011* (2013.01);
(Continued)

(58) Field of Classification Search
CPC ....... G06T 15/00; G06T 15/10; G06T 7/0065; G06T 15/20; G06T 19/20; G06F 3/016; G06F 3/0346; G06F 3/03545
See application file for complete search history.

(56) References Cited

U.S. PATENT DOCUMENTS 5,900,849 A  5/1999 Gallery
6,152,854 A  11/2000 Carmein
(Continued)

FOREIGN PATENT DOCUMENTS

EP  0772790 A1  5/1997
EP  2693255 A1  2/2014
(Continued)

OTHER PUBLICATIONS

Basso, et al., "Fitting 3D Morphable Models Using Implicit Representations", In Journal of Virtual Reality and Broadcasting, vol. 4, No. 18, Feb. 28, 2008, 10 Pages.
(Continued)

*Primary Examiner* — Sing-Wai Wu
(74) *Attorney, Agent, or Firm* — Lyon & Harr, LLP; Mark A. Watson

(57) ABSTRACT

An "Anchored Environment Generator" generates a physically constrained virtual environment that is molded and anchored to a real-world environment around a user (or multiple users). This molding and anchoring of the physically constrained virtual environment ensures that at least a portion of the physically constrained virtual environment matches tactile truth for one or more surfaces and objects within the real-world environment. Real objects and surfaces in the real-world environment may appear as different virtual objects, and may have different functionality, in the physically constrained virtual environment. Consequently, users may move around within the physically constrained virtual environment while touching and interacting with virtual objects in the physically constrained virtual environment. In some implementations, the physically constrained virtual environment is constructed from virtual building blocks that are consistent with a theme-based specification (e.g., French bistro, space station, starship, alternate real-
(Continued)

world environments, alien world, apocalyptic wasteland, medieval village, hospital, castle, etc.).

20 Claims, 6 Drawing Sheets

(51) Int. Cl.
| | |
|---|---|
| G02B 27/01 | (2006.01) |
| G06T 17/00 | (2006.01) |
| G06T 19/20 | (2011.01) |
| A63F 13/65 | (2014.01) |
| G06F 3/0481 | (2013.01) |

(52) U.S. Cl.
CPC .............. *G06F 3/012* (2013.01); *G06F 3/016* (2013.01); *G06F 3/017* (2013.01); *G06F 3/04815* (2013.01); *G06T 17/00* (2013.01); *G06T 19/20* (2013.01); *G06F 2203/013* (2013.01); *G06T 2200/04* (2013.01); *G06T 2219/2004* (2013.01); *G06T 2219/2021* (2013.01)

(56) References Cited

U.S. PATENT DOCUMENTS

| | | |
|---|---|---|
| 6,191,796 B1 | 2/2001 | Tarr |
| 6,268,862 B1 | 7/2001 | Uchiyama et al. |
| 6,441,815 B1 | 8/2002 | McDowall et al. |
| 6,891,518 B2 | 5/2005 | Sauer et al. |
| 7,398,481 B2 | 7/2008 | Kraus et al. |
| 7,864,168 B2 | 1/2011 | French |
| 7,864,173 B2 | 1/2011 | Handley et al. |
| 7,889,195 B2 | 2/2011 | Shih et al. |
| 7,973,786 B2 | 7/2011 | Gyorfi et al. |
| 8,225,226 B2 | 7/2012 | Skourup et al. |
| 8,243,099 B2 | 8/2012 | Ryu et al. |
| 8,271,365 B2 | 9/2012 | Jung et al. |
| 8,350,843 B2 | 1/2013 | Rogowitz et al. |
| 8,384,665 B1 | 2/2013 | Powers, III et al. |
| 8,553,049 B2 | 10/2013 | Nogami et al. |
| 8,574,076 B2 | 11/2013 | Mahajan et al. |
| 8,576,276 B2 | 11/2013 | Bar-Zeev et al. |
| 8,585,476 B2 | 11/2013 | Mullen |
| 8,624,924 B2 | 1/2014 | Dobbins et al. |
| 8,730,156 B2 | 5/2014 | Weising et al. |
| 2002/0190989 A1 | 12/2002 | Kamata et al. |
| 2005/0131846 A1 | 6/2005 | Kurzweil |
| 2006/0024647 A1 | 2/2006 | Chesnais et al. |
| 2006/0105838 A1* | 5/2006 | Mullen .................... A63F 13/00 463/31 |
| 2006/0209019 A1 | 9/2006 | Hu |
| 2008/0180654 A1 | 7/2008 | Bathiche et al. |
| 2008/0215994 A1 | 9/2008 | Harrison et al. |
| 2008/0266323 A1 | 10/2008 | Biocca et al. |
| 2009/0225074 A1 | 9/2009 | Bates et al. |
| 2009/0262118 A1* | 10/2009 | Arikan .................... G06T 13/40 345/473 |
| 2010/0103075 A1 | 4/2010 | Kalaboukis et al. |
| 2010/0103196 A1 | 4/2010 | Kumar et al. |
| 2010/0246675 A1* | 9/2010 | Gharavi-Alkhansari H04N 19/105 375/240.13 |
| 2010/0315412 A1 | 12/2010 | Sinha et al. |
| 2011/0078592 A1 | 3/2011 | Dawson et al. |
| 2011/0216089 A1* | 9/2011 | Leung .................... G06T 7/0034 345/633 |
| 2012/0017147 A1 | 1/2012 | Mark |
| 2012/0113223 A1 | 5/2012 | Hilliges et al. |
| 2012/0122570 A1 | 5/2012 | Baronoff |
| 2012/0139906 A1 | 6/2012 | Zhang et al. |
| 2012/0142415 A1 | 6/2012 | Lindsay |
| 2012/0147039 A1 | 6/2012 | Wang et al. |
| 2012/0249587 A1 | 10/2012 | Anderson et al. |
| 2012/0264510 A1 | 10/2012 | Wigdor et al. |
| 2013/0093788 A1 | 4/2013 | Liu et al. |
| 2013/0120365 A1 | 5/2013 | Lee et al. |
| 2013/0141421 A1 | 6/2013 | Mount et al. |
| 2013/0196772 A1 | 8/2013 | Latta et al. |
| 2013/0222393 A1* | 8/2013 | Merrell .................... G06T 11/00 345/441 |
| 2013/0296043 A1 | 11/2013 | Weinshanker et al. |
| 2013/0335405 A1 | 12/2013 | Scavezze et al. |
| 2014/0022283 A1 | 1/2014 | Chan et al. |
| 2014/0104274 A1 | 4/2014 | Hilliges et al. |
| 2014/0128161 A1 | 5/2014 | Latta et al. |
| 2014/0139551 A1 | 5/2014 | McCulloch et al. |
| 2014/0152558 A1 | 6/2014 | Salter et al. |
| 2014/0160157 A1 | 6/2014 | Poulos et al. |
| 2014/0168264 A1 | 6/2014 | Harrison et al. |
| 2014/0285518 A1 | 9/2014 | Tanaka et al. |
| 2014/0361977 A1 | 12/2014 | Stafford et al. |
| 2014/0364215 A1 | 12/2014 | Mikhailov et al. |
| 2014/0368537 A1 | 12/2014 | Salter et al. |
| 2015/0024368 A1 | 1/2015 | King, Jr. |
| 2015/0235434 A1 | 8/2015 | Miller et al. |
| 2016/0054837 A1 | 2/2016 | Stafford |

FOREIGN PATENT DOCUMENTS

| | | |
|---|---|---|
| EP | 2724191 A2 | 4/2014 |
| WO | 1997019398 A1 | 5/1997 |
| WO | 2011112328 A2 | 9/2011 |
| WO | 2013155217 A1 | 10/2013 |
| WO | 2014033722 A1 | 3/2014 |
| WO | 2014053346 A1 | 4/2014 |
| WO | 2015006784 A2 | 1/2015 |

OTHER PUBLICATIONS

Billinghurst, et al., "Tangible Augmented Reality", In ACM Special Interest Group on Computer Graphics and Interactive Techniques, Dec. 10, 2008, 10 Pages.

Broll, et al., "The Virtual Round Table—A Collaborative Augmented Multi-User Environment", In Proceedings of the Third Tnternational Conference on Collaborative Virtual Environments, Sep. 1, 2000, pp. 39-45.

"International Search Report & Written Opinion Issued in PCT Application No. PCT/US2016/016039", dated Jun. 6, 2016, 13 Pages.

Knopf, et al., "Reconstructing complex scenes for virtual reality", In SPIE, Oct. 20, 2011, 3 pages.

Posada, et al., "Semantic Classification of Scenes and Places with Omnidirectional Vision", In European Conference on Mobile Records, Sep. 25, 2013, pp. 113-118.

Smelik, et al., "A Survey on Procedural Modeling for Virtual Worlds", In Computer Graphics Forum, Jan. 15, 2014, 20 pages.

Biggers, et al., "Inference-based Surface Reconstruction of Cluttered Environments", In Technical Report Tamu-CS-TR-2009-6-1, Aug. 2012, 12 pages.

Fleury, et al., "A Generic Model for Embedding Users' Physical Workspaces into Multi-Scale Collaborative Virtual Environments", In 20th International Conference on Artificial Reality and Telexistence (ICAT), Dec. 1, 2010, 8 pages.

Nystrom, et al., "Modern Web and Video Technologies Survey for New Interactions", In Compeit Survey, Nov. 2013, 22 pages.

Hill, Matt., Opinion: Oculus selling to Facebook is no shock, the future of VR is not games, Published on: Mar. 26, 2014 Available at: http://www.t3.com/news/opinion-oculus-selling-to-facebook-is-no-shock-the-future-of-vr-is-not-games-1.

Verdie, et al. "Detecting parametric objects in large scenes by Monte Carlo sampling." International Journal of Computer Vision, Springer Verlag (Germany), 2014, 106 (1), pp. 57-75.

Merrell, et al., "Interactive Furniture Layout Using Interior Design Guidelines" ACM Transactions on Graphics Proc., SIGGRAPH 2011, 9 pages.

Yu, et al., Make it Home: Automatic Optimization of Furniture Arrangement. ACM Trans. Graph. 30, 4, Article 86 (Jul. 2011), 11 pages.

(56) References Cited

OTHER PUBLICATIONS

Bailenson, Jeremy N., "Transformed Social Interaction in Collaborative Virtual Environments", In Proceedings of Digital Media: Transformations in Human Communication, Jan. 2006, pp. 1-20.
Bohil, et al, "Anatomy of a Virtual Environment", In Journal of Nature Reviews Neuroscience, Dec. 2011, 4 pages.
Dodds, Trevor, "Trevor Dodds—Max Plank Institute for Biological Cybernetics", Published on: Jul. 6, 2013, Available at: http://www.kyb.tuebingen.mpg.de/nc/employee/details/dodds.html.
Dubey, et al., "Inertia Reduction in Haptic Devices Using Force Feedback Method", In International Journal of Advanced Research in Computer Science and Software Engineering, vol. 2, Issue 8, Aug. 2012, pp. 28-36.
Fisch, et al., "Haptic Devices for Virtual Reality, Telepresence and Human-Assistive Robotics", In Proceedings of Biologically-Inspired Intelligent Robots, May 13, 2003, 24 pages.
Fuchs, et al., "Virtually Face-To-Face: Telecommunication and Collaboration using Virtual Reality", In Proceedings of IEEE Virtual Reality, Mar. 16, 2013, 3 pages.
Gurocak, Haptic Interfaces, Published on: Apr. 16, 2013, Available at: http://research.vancouver.wsu.edu/dr-hakan-gurocak/haptic-interfaces.
Hammer, et al., "Robust hand Tracking in Realtime using a Single Head-Mounted RGB Camera", In Proceedings of 15th International Conference, HCI International, Part 4, Jul. 21, 2013, 4 pages.
Hrimech, et al., "How 3D Interaction Metaphors Affect User Experience in Collaborative Virtual Environment", In Journal of Advances in Human-Computer Interaction, vol. 2011, Jan. 1, 2011, 18 pages.
Jarvis, Matthew., "Backed to the Future: The Crowdfunded Tech of 2014 and Beyond", Published on: Dec. 6, 2013, Available at: http://www.pcr-online.biz/news/read/backed-to-the-future-the-crowdfunded-tech-of-2014-and-beyond/032657.
Kale, Emory, "Disney Research Develops Method to Provide Tactile Feedback in Free Air", Published on: Jul. 19, 2013, Available at: http://www.tgdaily.com/general-science-brief/72566-disney-research-develops-method-to-provide-tactile-feedback-in-free-air.
Kanbara, et al., "A Stereoscopic Video see-through Augmented Reality System based on Real-Time vision-based Registration", In Proceedings of IEEE Virtual Reality, Mar. 18, 2000, 8 pages.
Mackay, Wendy E., Augmented Reality: Linking Real and Virtual Worlds A New Paradigm for Interacting With Computers, In Proceedings of ACM Conference on Advanced Visual Interfaces, May 24, 1998, 10 pages.
Milgram, et al., "A Taxonomy of Mixed Reality Visual Displays", In Proceedings of IEICE Transactions on Information and Systems, vol. E77-D, No. 12, Dec. 1994, 14 pages.
Patkar, et al., "Marker Based Augmented Reality Using Android OS", In International Journal of Advanced Research in Computer Science and Software Engineering, vol. 3, Issue 5, May 2013, 6 pages.
Regenbrecht, et al., "Virtual Reality Aided Assembly with Directional Vibro-Tactile Feedback", In Proceedings of the 3rd international conference on Computer graphics and interactive techniques, Nov. 29, 2005, 9 pages.
Rhienmora, et al., "Augmented Reality Haptics System for Dental Surgical Skills Training", In Proceedings of 17th ACM Symposium on Virtual Reality Software and Technology, Nov. 22, 2010, 2 pages.

Sampson, Demetrios G., Book Review "Collaborative Virtual Environments: Digital Places and Spaces for Interaction", In Journal of Educational Technology & Society, vol. 5, Issue 4, Oct. 2002, 3 pages.
Snowdon et al., Collaborative Collaborative Virtual Environments: Digital Spaces and Places for CSCW: An Introduction, Springer Verlag, 2000, pp. 1-34.
Subramanian, et al., "Feeling Virtual Objects in Mid-Air Using Ultrasound", In Proceedings of ACM Transactions on Graphics, Dec. 3, 2014, 3 pages.
Sung, Dan, "The World's Most Hotly Anticipated Wearables", Published on: Feb. 25, 2015, Available at: http://www.wareable.com/internet-of-things/the-worlds-most-hotly-anticipated-wearables.
Thimmesch, Debra, "Japanese Tech Firm, Miraisens, Unveils New "Touchable" 3D Technology Which May Influence 3D Printing", Published on: Sep. 4, 2014, Available at: http://3dprint.com/13596/touchable-3d-technology/.
VHIL: Virtual Human Interaction Lab, Retrieved on: Mar. 9, 2015, Available at: http://vhil.stanford.edu/projects/archive/.
Virtual Reality Blog, Collaborative Virtual Environments, Published on: Dec. 22, 2013, Available at: http://www.vrs.org.uk/virtual-reality-environments/collaborative.html.
Virtual Reality Blog, The Virtual Reality Headset, Published on: May 3, 2009, Available at: http://www.vrs.org.uk/virtual-reality/headset.html.
Ye, et al., "VisHap: Augmented Reality Combining Haptics and Vision", In Proceedings of IEEE International Conference on Systems, Man and Cybernetics, vol. 4, Oct. 5, 2003, pp. 3425-3431.
"Second Written Opinion Received for PCT Application No. PCT/US2016/016039", dated Jan. 10, 2017 7 Pages.
Hilgendorf, D. W., U.S. Office Action, U.S. Appl. No. 14/724,360, dated Aug. 24, 2016, pp. 1-25.
Pan, et al., "Virtual Reality and Mixed Reality for Virtual Learning Environments," Computer & Graphics, vol. 30, No. 1, Feb. 2006, pp. 20-28.
Sud, et al., Real-Time Path Planning in Dynamic Virtual Environment Using Multiagent Navigation Graphs, IEEE Trans. Vis. Comput. Graph., vol. 14, No. 3, May/Jun. 2008, pp. 526-538.
Hilgendorf, U.S. Notice of Allowance, U.S. Appl. No. 14/724,360, dated Jan. 4, 2017, pp. 1-10.
Zhai, U.S. Office Action, U.S. Appl. No. 14/724,503, dated Jan. 13, 2017, pp. 1-20.
"Second Written Opinion Issued in PCT Application No. PCT/US2016/030619", dated Apr. 25, 2017, 13 Pages.
Hilgendorf, U.S. Office Action, U.S. Appl. No. 14/724,360, dated Mar. 15, 2017, pp. 1-17.
Zhai, U.S. Final Office Action, U.S. Appl. No. 14/724,503, dated May 17, 2017, pp. 1-24.
Billinghurst M., et al., Collaboration with tangible augmented reality interfaces. In HCI Int'l, Aug. 2001, vol. 1, pp. 5-10.
Schmalstieg, D., et al., Bridging multiple user interface dimensions with augmented reality, Proceedings IEEE and ACM International Symposium on Augmented Reality (ISAR 2000), Munich, Oct. 2000, pp. 20-29.
Hilgendorf, U.S. Notice of Allowance, U.S. Appl. No. 14/724,360, dated Jul. 24, 2017, pp. 1-17.
"International Preliminary Report on Patentability Issued in PCT Application No. PCT/US2016/016039", dated May 9, 2017, 10 Pages.

\* cited by examiner

MOLDING AND ANCHORING PHYSICALLY CONSTRAINED VIRTUAL ENVIRONMENTS TO REAL-WORLD ENVIRONMENTS

BACKGROUND

Many applications for augmented reality (AR) devices and scenarios construct augmented content, such as 2D overlays, text, virtual objects, etc. Augmented content may also be added to other types of applications, such as 2D overlays and text over an image. In other words, an AR device often shows a view of the world, with some overlay layer of information. In contrast to these types of AR scenarios, virtual reality (VR) devices, such as a wearable headset, generally present the user with a completely virtual environment. In completely virtual environments, there is no connection between objects in reality and the VR scene.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be noted or discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, an "Anchored Environment Generator," as described herein, provides various techniques for generating a virtual environment that is molded and anchored to a real-world environment around a user (or multiple users in the same real-world environment) to produce a physically constrained virtual environment. Note that the physically constrained virtual environment is also sometimes referred to herein as a "tactile virtual reality" (TVR). This molding and anchoring of the TVR ensures that at least a portion of the TVR matches tactile truth for one or more surfaces and objects within the real-world environment. In some implementations, the TVR is procedurally constructed from virtual building blocks that are consistent with a theme-based environmental specification (e.g., French bistro, space station, starship, alternate real-world environments, alien world, apocalyptic wasteland, medieval village, hospital, castle, etc.).

The Anchored Environment Generator renders and presents the physically constrained virtual environment via a display device, such as a head mounted display or the like. Real objects and surfaces in the real-world environment may appear as different virtual objects, and may have different functionality, in the TVR. As such, users may move around within the real-world environment (without seeing the real-world environment) while touching and interacting with virtual objects in the TVR. In other words, in various implementations, the view of the TVR replaces the view of the real-world environment around the user while still allowing the user to physically interact with surfaces and objects in the real world via the TVR. Consequently, the physically constrained virtual environment improves user interaction and safety by enabling users to see, touch, and interact with virtual objects that are molded and anchored around, or relative to, real-world static and dynamic surfaces and objects (also including real people and animals).

In various implementations, the Anchored Environment Generator first generates environmental information for a particular location or environment by scanning (either as a pre-processing step or in real-time) a real-world environment to classify geometry, and optionally other characteristics and functionality, of surfaces and objects within that environment. In addition, the Anchored Environment Generator receives a master set of virtual building blocks. Each of these virtual building blocks includes a plurality of characteristics in addition to various semantic, geometric, and optional objective constraints relating to the virtual building blocks. Note that in various implementations, the master set of virtual building blocks may optionally be selected based on a plurality of predefined or user generated themes.

Given the environmental information, the Anchored Environment Generator procedurally molds a physically constrained virtual environment by iteratively optimizing a layout of an automatically selected variable subset of the virtual building blocks relative to a scene-specific cost function. Each iteration of this optimized layout of the physically constrained virtual environment is consistent with the characteristics and constraints of the subset of virtual building blocks, and the environmental information of the real-world environment. Further, the scene-specific cost function is automatically derived for each iteration from the characteristics and constraints of the subset of virtual building blocks in combination with the environmental information.

Finally, the Anchored Environment Generator renders and displays the physically constrained virtual environment via a display device, such that at least a portion of the first physically constrained virtual environment is anchored to the first real-world environment in a way that matches tactile truth for one or more surfaces and objects within the first real-world environment.

In view of the above summary, it is clear that the Anchored Environment Generator described herein provides various techniques for generating a physically constrained virtual environment that is molded and anchored to a real-world environment around a user in a way that at least partially matches tactile truth for one or more surfaces and objects within the real-world environment. In addition to the just described benefits, other advantages of the Anchored Environment Generator will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
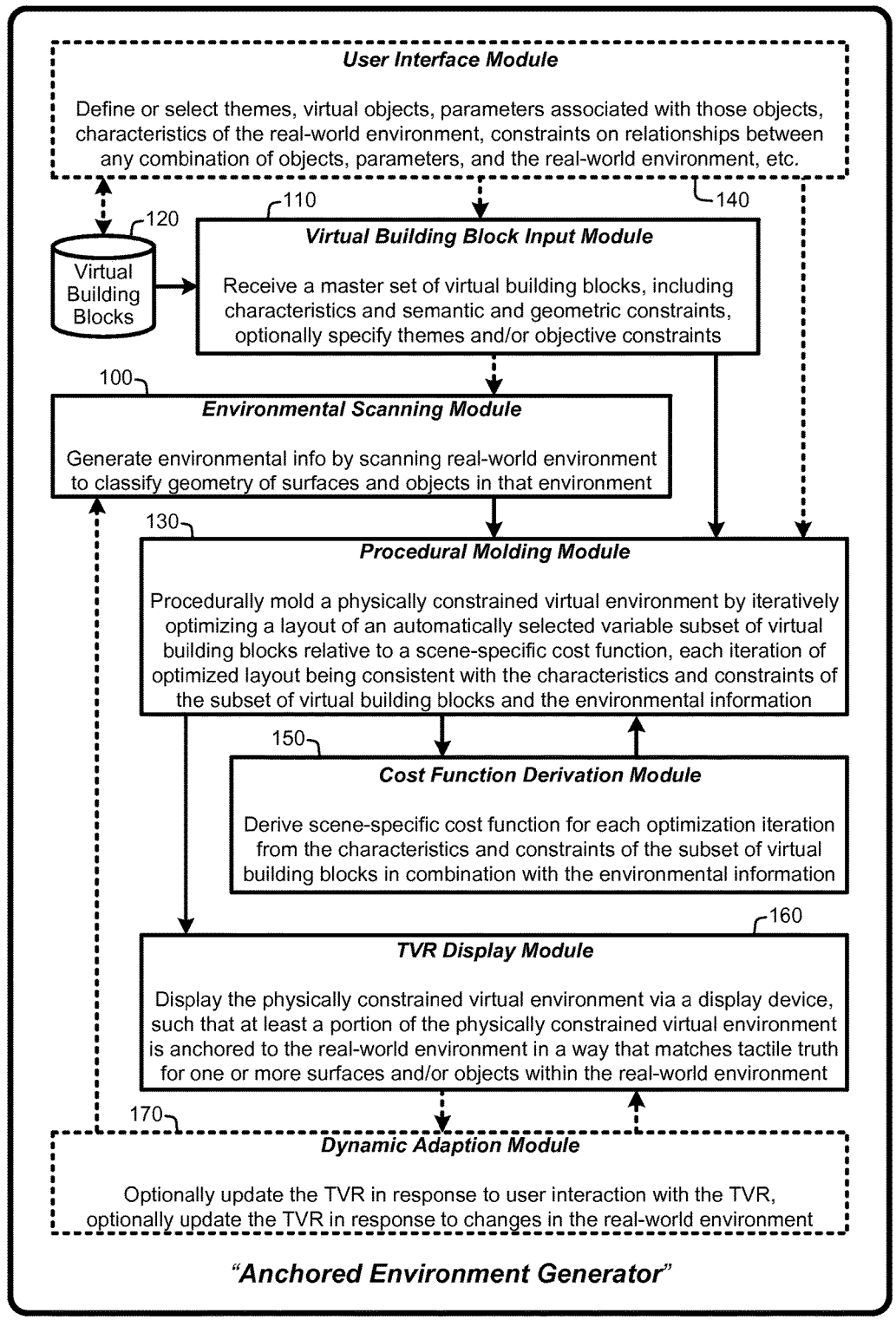
FIG. 1 provides an exemplary architectural flow diagram that illustrates program modules for effecting various implementations of an "Anchored Environment Generator," as described herein.

In the following description of various implementations of an "Anchored Environment Generator," reference is made to the accompanying drawings, which form a part hereof, and in which is shown by way of illustration specific implementations in which the Anchored Environment Generator may be practiced. It should be understood that other implementations may be utilized and structural changes may be made without departing from the scope thereof.

It is also noted that, for the sake of clarity, specific terminology will be resorted to in describing the various implementations described herein, and that it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Anchored Environment Generator. Further, the appearance of such phrases throughout the specification are not necessarily all referring to the same implementation, nor are separate or alternative implementations mutually exclusive of other implementations.

It should also be understood that the order described or illustrated herein for any process flows representing one or more implementations of the Anchored Environment Generator does not inherently indicate any requirement for the processes to be implemented in the order described or illustrated, nor does any such order described or illustrated herein for any process flows imply any limitations of the Anchored Environment Generator.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

In general, an "Anchored Environment Generator," as described herein, provides various techniques for procedurally generating a physically constrained virtual environment that is molded and anchored to a real-world environment around a user (or multiple users in the same real-world environment) in a way that matches tactile truth for one or more surfaces and objects within the real-world environment. Note that in the case of multiple users, representations of those users (or virtual avatars or characters that move in place of those users) may be rendered into the TVR so that users can see and interact with each other within the TVR. Note that the physically constrained virtual environment is also sometimes referred to herein as a "tactile virtual reality" (TVR). In some implementations, the TVR is constructed from virtual building blocks that are consistent with a theme-based environmental specification (e.g., French bistro, space station, starship, alternate real-world environments, alien world, apocalyptic wasteland, medieval village, hospital, castle, etc.).

The Anchored Environment Generator renders and presents the physically constrained virtual environment to the user via a display device. For example, in some implementations, the TVR is presented to the user via display devices including, but not limited to, a head-mounted display, eye-worn contact lens-based display devices, smart glasses, etc. In related implementations, a movable window into the TVR is provided via other digital display devices including, but not limited to, a tablet, smartphone, or other portable screen or display device. Any display device used to present the TVR may be controlled on a pixel-by-pixel basis to present the TVR to the user in a way that allows the user to move through, look into, and physically interact with different parts of the TVR without actually seeing the underlying real-world environment unless some component or object of the real-world environment is intentionally rendered and displayed within the TVR.

Further, the Anchored Environment Generator and any of the display devices used to present the TVR may optionally sense or respond to user motions, and to motions of other real people, animals and objects. This enables the Anchored Environment Generator to dynamically modify the rendered content of the TVR to correspond to real-world environmental changes and/or user motion, position, and actions while interacting with the TVR. User motions and interactions with the TVR may also be determined through the application of any desired combination of body worn or external image sensing devices and motion sensing devices that provide real-time input to the Anchored Environment Generator.

One of the many advantages of the physically constrained virtual environment generated by the Anchored Environment Generator is that real objects and surfaces in the real-world environment may appear in the TVR as different virtual objects and may have different functionality than the real objects and surfaces. As such, users may move around within the real-world environment (without actually seeing the real-world environment) while touching and interacting with virtual objects in the TVR. In other words, in various implementations, the view of the TVR replaces the real-world environment around the user while still allowing the user to physically interact with surfaces and objects in the real world via virtual surfaces and objects in the TVR.

Note that some real objects and surfaces in the real-world environment may optionally be hidden by the TVR, e.g., a real-world wall with doors, windows, and hanging pictures may appear as a virtual flowing river or open field (or any other virtual entity), or simply empty space. Conversely, digital representations, including live or augmented video and/or audio pass-through captured via any of a plurality of sensing devices from any combination of real-world objects, animals, and people may be intentionally rendered and presented in the TVR at any desired time. For example: a real-world ringing telephone may fade into view in the TVR for purposes of user interaction; a plate of real food or a real drink may be visible for consumption by the user if the user indicates hunger, while such food may appear as a virtual potted plant or other virtual object if the user has not indicated hunger; etc. Further, any such real-world objects or entities may also be rendered and displayed in the TVR as compatible virtual objects that may provide some or all of the functionality of the corresponding real-world objects. As such, the user can continue to interact with one or more elements of the real-world environment even while fully immersed in the TVR.

Note also that virtual objects in the TVR are not necessarily a one-to-one mapping to the extents of real-world analogues or other real-world objects. For example, a virtual window to outer space showing a dynamic space battle or an exploding star may be displayed via the physically constrained virtual environment as existing within the boundaries of a solid wall (or a solid floor or ceiling) in the real-world environment. Similarly given sufficient imaging of a real-world room (or any other real-world space anywhere in the world) real walls or portions of such walls (or whatever is being displayed in place of those walls in the TVR) may be virtually removed or made transparent within the TVR to provide a virtual real-time view or window into that adjacent or remote real-world space from inside the TVR.

In another simple example of partial mapping of virtual objects to the extents of real-world objects, the hilt of a virtual sword may be displayed in the TVR such that it is molded and anchored to the location of a user's real cell phone (or other real object) in the real-world environment. In this way, when the user picks up the cell phone, which would appear to the user as the hilt of the virtual sword, the entire virtual sword will move in the TVR being presented to the user as the user moves the cell phone. In this case, tactile truth will exist for a least a portion of the hilt of the virtual sword rendered in place of the cell phone, but will not exist for the remainder of the virtual sword, including the blade of the sword. Note that in various implementations, motion sensors, imaging devices, etc., in a cell phone (or any other device with such sensors) may be accessed by the Anchored Environment Generator, using any existing wired or wireless communications protocols, to track and respond to motions of the corresponding virtual sword (or other virtual object).

In another simple example, an old armchair (or some other physical object that presents a seating surface) in the real-world environment may be displayed to the user as an ornate throne or as a seating surface on a fallen log in the TVR. This enables the user to physically touch the virtual ornate throne, sit in the virtual ornate throne, move the virtual ornate throne, place objects on the virtual ornate throne, etc., without actually seeing the corresponding real-world physical armchair or seating surface. Similarly, virtual remodels of existing real-world spaces, walls, surfaces, buildings, outdoor spaces and landscaping, etc., can be rendered in the TVR having different colors, textures, patterns, combinations, scales and placements of virtual objects, etc. Note that the term "affordances" may be used herein to refer to such concepts. In other words, functional characteristics of underlying real-world objects may be incorporated into virtual objects for use by the user, even where those real-world objects are not visible to the user.

Consequently, presentation of the physically constrained virtual environment improves user experience and interaction performance within virtual environments by allowing users to move within and to physically interact with virtual environments that are molded and anchored to real-world environments without actually displaying the real-world environment to the user. In addition, user safety and safety of other people and objects within the real-world environment are also improved by molding and anchoring the TVR to the real-world environment, and by providing various mechanisms for interacting with real-world objects while users are immersed in the TVR.

In addition, in various implementations, the TVR is a 3D virtual environment within a 3D real-world space. Consequently, in such implementations, the TVR remains consistent (from different viewpoints and perspectives) as the user (or multiple users) look around or move within the corresponding real-world environment. As such user safety and user interaction are both improved for single users and for multiple users interacting with the TVR in the same real-world environment.

For example, as noted above, the TVR constructed by the Anchored Environment Generator is molded and anchored to the real-world environment in a way that at least partially matches tactile truth for one or more surfaces and objects within the real-world environment. Consequently, without actually seeing the real-world environment, the user can avoid accidental contact with real-world people, animals, surfaces and objects by simply moving within and interacting with virtual surfaces and objects in the TVR. In other words, in various implementations, the Anchored Environmental Generator adds safety and security to a mobile user in a virtual world, without the need for illusion disruptive measures such as safety markers and the structure of the real world. However, in various implementations, virtual renderings of real objects or safety markers or the like may be statically or dynamically rendered into the TVR to highlight real-world objects to be used, or real-world objects or obstacles to be avoided, within the real-world environment.

In various implementations, the general process for construction of the TVR includes, but is not limited to the following steps:
1. Determination of environmental information via automated scene scanning and scene processing techniques to provide a contextual and semantic understanding of the real-world environment around the user. Note that the automated scene scanning and scene processing may be performed as a pre-processing step or as a real-time step, or as some combination of pre-processing and real-time operations;
2. Optimization of constraints associated with virtual objects in view of the contextual and semantic understanding of the real-world environment around the user. These constraints may include, but are not limited to:
   a. Geometric constraints relating to the real-world environment and virtual objects to be rendered into the corresponding TVR. Note that one of the purposes for use of these geometric constraints is to ensure that that the underlying geometry of the environment can be used to provide tactile truth to one or more of the virtual elements of the TVR;

b. Semantic constraints relating to virtual object functionality and corresponding contextual relationships between the real-world environment and those virtual objects, and also relating to functional and/or contextual relationships between two or more of the virtual objects; and c. Optional objective constraints relating to a purpose or intent associated with the TVR, e.g., locate a virtual treasure in a castle after slaying virtual monsters in the TVR.

3. Perform static and/or dynamic construction and presentation or rendering of the TVR (with optional fixed or directional audio content) into a display device (from the results of the constraint-based optimization;

4. Respond to dynamic objects, people, animals, etc., in the real-world environment by repeating any or all of steps 1, 2 and 3 when anything in the real-world environment moves or otherwise changes to provide real-time updates to the TVR. In other words, the physically constrained virtual environment may change over time in a way that is consistent with the optimized constraints, which may also change over time in view of dynamic objects or changes to the environment.

5. Real-time user interaction with the physically constrained virtual environment. This may result in changes to the real-world environment or to objects, people, or animals in the real-world environment, or to virtual content in the TVR. These changes may then result in repeating any or all of steps 1 to 4 to provide real-time updates to the TVR.

1.1 System Overview:

As noted above, the "Anchored Environment Generator," provides various techniques for generating a physically constrained virtual environment that is molded and anchored to a real-world environment around a user in a way that matches tactile truth for one or more surfaces and objects within the real-world environment. The processes summarized above are illustrated by the general system diagram of FIG. 1. In particular, the system diagram of FIG. 1 illustrates the interrelationships between program modules for implementing various implementations of the Anchored Environment Generator, as described herein. Furthermore, while the system diagram of FIG. 1 illustrates a high-level view of various implementations of the Anchored Environment Generator, FIG. 1 is not intended to provide an exhaustive or complete illustration of every possible implementation of the Anchored Environment Generator as described throughout this document.

In addition, it should be noted that any boxes and interconnections between boxes that may be represented by broken or dashed lines in FIG. 1 represent alternate implementations of the Anchored Environment Generator described herein, and that any or all of these alternate implementations, as described below, may be used in combination with other alternate implementations that are described throughout this document.

In general, as illustrated by FIG. 1, various implementations of the processes enabled by the Anchored Environment Generator begin operation by applying an environmental scanning module 100 to generate environmental information by using a variety of sensors (e.g., 2D cameras, 3D depth cameras, laser scanning devices, or other imaging and/or ranging sensors) to scan a real-world environment. The resulting sensor information is then applied to classify geometry of surfaces and objects within that environment.

A virtual building block Input Module 110 then receives a master set of virtual building blocks 120. Each of these virtual building blocks 120 includes various characteristics (e.g., 3D models, textures, materials, etc.) in addition to semantic and geometric constraints and optional objective constraints. In various implementations, the set of virtual building blocks 120 is optionally limited to virtual objects corresponding to an optionally specified theme. Examples of such themes include, but are not limited to, e.g., French bistro, space station, starship, alternate real-world environments, alien world, apocalyptic wasteland, medieval village, hospital, castle, battlefield, sporting arena, etc. In other words, the set of virtual building blocks 120 consists of 3D objects, textures, materials, colors, and a set of rules that ensure the internal consistency of such objects relative to the TVR. For example, such rules may include that there are no more than one virtual airlocks in a room, no more than two virtual windows to outer space, etc.

In various implementations, some of the constraints and characteristics of the virtual objects may be provided via a user interface module 140 that enables the user or designer to specify or select any combination of optional user-supplied constraints, themes, relationships between virtual objects, parameters or characteristics of virtual objects, etc. In other words, in various implementations, the user interface module 140 enables users or designers to define or select themes, virtual objects, parameters associated with those objects, constraints that define relationships between any combination of objects, parameters, and the real-world environment, etc.

A procedural molding module 130 then procedurally molds a physically constrained virtual environment by iteratively optimizing a layout of an automatically selected subset of the virtual building blocks for use in constructing the physically constrained virtual environment relative to a scene-specific cost function. Each iteration of the optimized layout of virtual building blocks of the physically constrained virtual environment is consistent with the characteristics and constraints of the virtual building blocks and the environmental information of the real-world environment.

A cost function derivation module 150 is applied to derive the aforementioned cost function for each optimization iteration performed by the procedural molding module 130. This cost function is derived from the characteristics and constraints of the subset of virtual building blocks in combination with the environmental information.

A TVR display module 160 then renders and displays the physically constrained virtual environment (i.e., the tactile virtual reality (TVR)) via a display device, such that at least a portion of the physically constrained virtual environment is anchored to the real-world environment in a way that at least partially matches tactile truth for one or more surfaces and objects within the real-world environment. Finally, in various implementations, a dynamic adaption module 170 optionally updates the TVR in response to user interaction with the TVR and/or in response to changes in the real-world environment.

2.0 Operational Details of the Anchored Environment Generator:

The above-described program modules are employed for instantiating various implementations of the Anchored Environment Generator. As summarized above, the Anchored Environment Generator provides various techniques for generating a physically constrained virtual environment that is molded and anchored to a real-world environment around a user in a way that matches tactile truth for one or more surfaces and objects within the real-world environment. The following sections provide a detailed discussion of the operation of various implementations of the Anchored Environment Generator, and of exemplary methods for implementing the program modules described in Section 1 with respect to FIG. 1. In particular, the following sections provides examples and operational details of various implementations of the Anchored Environment Generator, including:

An operational overview of the Anchored Environment Generator;
Exemplary constraints used in construction of the TVR;
Anchored Procedural Level Generation (APLG) processes;
Application of Parallelism for Identifying TVR Solutions;
Exemplary Algorithms for TVR Construction: and
Exemplary Usage Scenarios.

2.1 Operational Overview:

As noted above, the Anchored Environment Generator-based processes described herein provide various techniques for generating a physically constrained virtual environment that is molded and anchored to a real-world environment around a user in a way that matches tactile truth for one or more surfaces and objects within the real-world environment. Note that the real-world environment associated with the TVR is not necessarily a room, but could be an entire floor, a suite of rooms, an entire building, an outdoor space, any combination of such spaces, etc.

In various implementations, the Anchored Environment Generator explicitly applies various rules and relationships provided by a designer or user for use by the Anchored Environment Generator. Further, in various implementations that Anchored Environment Generator applies various machine-learning techniques to learn or extract implicit design rules from a limited number of examples provided by a designer (e.g., several starship designs from which the Anchored Environment Generator learns how to model a new starship). Any combination of designer or user supplied rules and machine-learned rules may be combined for use in constructing the TVR. In either case, in various implementations, the Anchored Environment Generator applies such design rules to the master set of virtual building blocks to perform automated procedural generation of TVR levels, rooms, buildings, outdoor spaces, etc., under semantic constraints to at least partially match real-world geometry and functionality as well as optional designer aesthetics (or objective constraints) or user-selected or created themes.

In various implementations, the resulting physically constrained virtual environment may also include a plurality of items from the real world that are rendered into or otherwise incorporated within the TVR. For example, a physical resting place (e.g., a particular real-world chair or seating surface) may cause the Anchored Environment Generator to automatically pause dynamic content associated with the TVR (e.g., activating a "rest period" in an objective-based dynamic TVR) when accessed by the user. Similarly, a real object, such as a cell phone for example, may be accessed or used while the user is immersed in the TVR. However, as noted above, such real objects are rendered into the TVR since the physically constrained virtual environment of the TVR replaces the user's real-world surroundings to construct an immersive experience that acts as a gateway between reality and limitless virtual environments.

Figure 2:
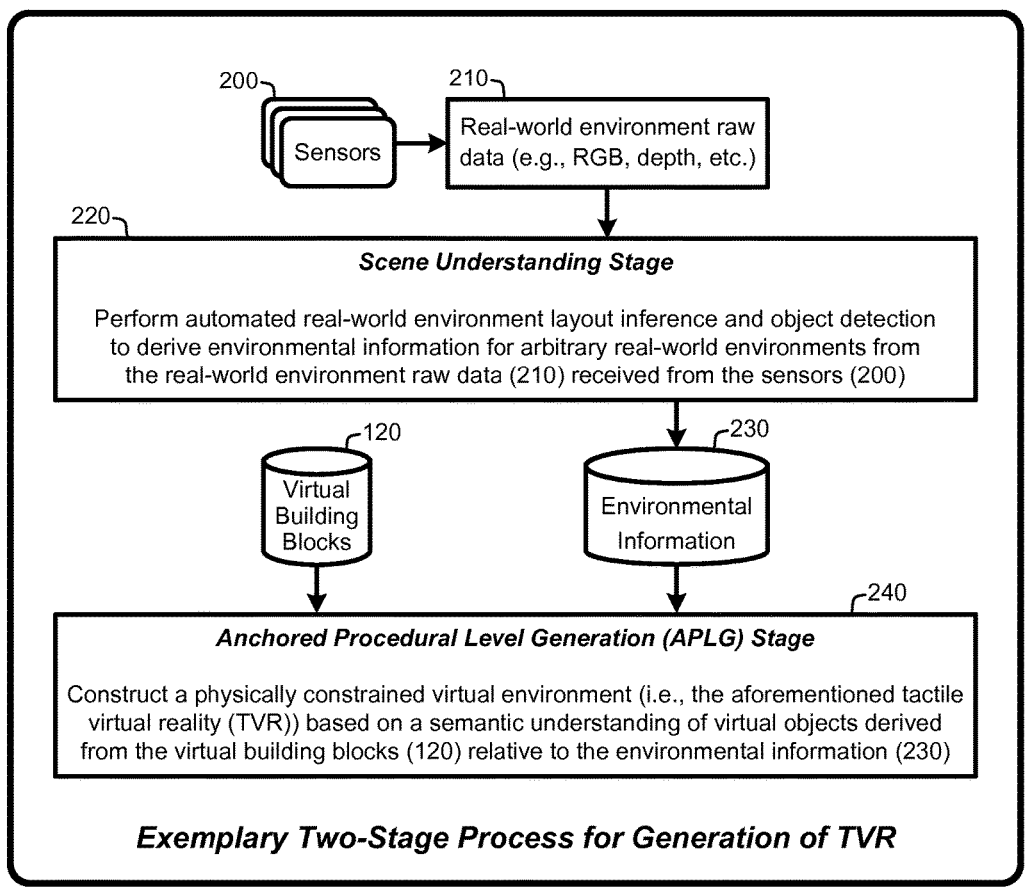
FIG. 2 illustrates an exemplary two-stage process for generation of a tactile virtual environment (TVR), as described herein.

In various implementations, as illustrated by FIG. 2, the Anchored Environment Generator operates as a two-stage process. The first stage of this two-part process is a scene understanding stage 220 that operates to perform automated real-world environment layout inference and object detection to derive environmental information 230 for arbitrary real-world environments from real-world environment raw data (210) received from various sensors (200) including, but not limited to 2D cameras, 3D depth cameras, laser scanning devices, or other imaging and/or ranging sensors. The second stage of this two part process is an anchored procedural level generation (APLG) stage 240 that generally operates to construct a physically constrained virtual environment (i.e., the aforementioned tactile virtual reality (TVR)) based on a semantic understanding of virtual objects derived from the virtual building blocks (120) relative to the environmental information (230).

In various implementations, the layout inference portion of the scene understanding stage applies various imaging and scene reconstruction techniques to construct a coarse 3D model of a real-world environment (e.g., single room, multiple rooms such as a home, complete office building floor or multiple floors, outdoor spaces, etc.) This 3D model represents a course blueprint of the real-world environment that provides the geometric structure of the real-world environment at the level of floors, walls, ceilings, openings such as doors and windows, division into rooms, etc. Advantageously, the Anchored Environment Generator is capable of operating with very noisy data, e.g., head mounted or handheld camera may be used to quickly sweep the real-world environment (including real-time sweeps) to construct the coarse 3D model of the real-world environment.

Further, in various implementations, determining the scene layout is also an inference, i.e., a constraint optimization process that may use the same optimization engine as that used for TVR construction, and which relies only on the scene (regardless of TVR used). The constraints in this case consider the total number of walls (and floors and ceilings) and cover the entire observed real-world scene or environment (e.g., the entire room). Further, during this optimization process, modeling solutions resulting in parallel walls and walls at preferred angles (e.g., 90-degree corners) are rewarded or given increased probability or weights, while walls at unexpected or unusual angles to each other are punished or given decreased probability or weights.

The object detection portion of the scene understanding stage generally acts to apply various object recognition techniques and processes to detect positions and instances of real objects in the real-world environment from one or more large sets of objects definitions, and to determine semantic understandings of those objects relative to the real-world environment. Object detection can be based on full or partial views of objects. For example, from the point of view of the user, or of imaging or scanning devices used to process the real-world environment, only the back of a chair (e.g., an approximately rectangular shape) may be visible adjacent to another real object already identified as a table. Contextual evaluation of this approximately rectangular shape may be sufficient to identify the object as a chair. Further, even if the detected object (e.g., a chair) is different from chairs in the database, but close enough (e.g., 85 percent probability that object is a chair), then that object may be labeled as a chair for purposes of constructing the TVR.

With respect to determining semantic understandings for objects, the Anchored Environment Generator evaluates identified objects relative to the real-world environment, and optionally to other identified real-world objects to determine affordances or characteristics of those objects. For example, in the case of an object identified as a chair, these semantic understandings may include information or affordances such as that the chair allows sitting (or placing objects on the seat), that the chair is not likely to be placed on the ceiling or on a couch, etc. Some of this information may also then be used to assign affordances to virtual objects (e.g., user sits in a virtual chair via an underlying real-world seating surface).

In various implementations, the optimization engine used by the APLG portion of the two stage process applies a set of rules and constraints, derived from the real-world environment, and with optional objective constraints and design criteria supplied by a designer or selected by a user, to mold and anchor a subset of available virtual objects from the master set of virtual building blocks to the real-world environment to construct the TVR. As discussed in further detail herein, various techniques, including, but not limited to a marked Markov point process (MMPP), are applied to implement the APLG process for constructing the TVR. The resulting physically constrained virtual environment retains tactile truth that at least partially matches the TVR to real objects and surfaces in the corresponding real-world environment. Further, in various implementations, the APLG process enables real-time updates to the TVR as the user moves within and interacts with the TVR to provide the user with a dynamic and immersive virtual experience.

2.2 Constraints:

As noted above, the TVR is constructed based on a constrained optimization of configurations of virtual objects within the TVR relative to various constraints and environmental information. Any number or types of constraints may be considered for this purpose. However, for purposes of explanation, three general types of design constraints are considered, including geometric constraints, semantic constraints, and objective constraints. These constraints may also optionally include design constraints provided by the designer, e.g., use of particular virtual objects, specific behavioral rules associated with those objects, general or specific appearance of those virtual objects, etc.

2.2.1 Geometric Constraints:

In general, geometric constraints ensure that when the user reaches out to touch something (real or virtual) in the TVR, an object is actually there to be touched (e.g., x, y, z coordinates of a virtual object in the TVR at least partially matches the same x, y, z coordinates of a real object or surface in the real-world environment). However, the virtual object may not be the same as the real object. For example, a virtual crate may be rendered in the place of a real-world table, so that it appears and feels to the user that she is touching the top of the virtual crate when she reaches out and actually touches the top of the real table. In other words, with geometric constraints, it doesn't matter what some virtual object looks like, so long as that when the user reaches out to touch it, there is some real world object or surface there to provide tactile feedback.

In various implementations, various tactile feedback features of the Anchored Environment Generator may be further tuned by causing the optimization engine to consider variable parameters or weights that include, but are not limited to a "reality coverage" level and a "fabrication ratio." Both of these variable parameters may be set or modified by the user or developer, and may be automatically defined by the Anchored Environment Generator in response to an automated determination as to one or more areas of a real-world scene that are likely to be either accessible or inaccessible to the user.

In general, the reality coverage parameter defines an approximate percentage of a real scene that is covered by virtual objects. A 100% reality coverage level means that all real-world physical items identified by the Anchored Environment Generator are represented virtually, either as virtual duplicates of those real-world physical items, as altered virtual versions of those real-world-physical items (e.g., color, texture, etc.), or as completely virtual objects that cover the real-world objects, as described herein. In general, a 100% reality coverage level tends to increase user safety since the user is less likely to make unintended contact with some real-world object that is hidden by the TVR.

However, with respect to optimization of the TVR, use of a 100% reality coverage level may be constraining under some circumstances (e.g., room size, number of objects, object placement, etc.). Consequently, in various implementations, different reality coverage weights may be assigned to different parts of the scene. For example, depending upon real-world ceiling height, the user may be unable (or unlikely) to physically reach the ceiling. In this case, the reality coverage weight of the ceiling may be reduced, potentially to zero. In other words, in various implementations, reality coverage weights or levels for a scene may depend on areas where the user is or is not likely to reach, with the reality coverage for areas of likely contact being increased relative to areas of unlikely contact.

In general, the fabrication ratio provides a measure of the amount of completely virtual material added to the scene. It should be understood that in contrast to virtual objects having some tactile truth, this completely virtual material represents completely virtual objects (or characters) that the user can't physically touch, though virtual interactions are still enabled in some implementations (e.g., talk to a virtual character, slay a virtual monster, etc.). Similar to the reality coverage weight, the fabrication ratio may also depend on areas of a real-world scene where the user is or is not likely to reach, with the fabrication ratio for areas of likely contact being decreased relative to areas of unlikely contact.

In other words, for areas of the real-world scene that the user is unlikely to reach, adjustments to the fabrication ration allows the amount of completely virtual objects to be increased to any level desired. For example, depending upon real-world ceiling height, the user may be unable to physically reach the ceiling. In this case, the fabrication ratio of the ceiling may be increased, potentially to 100%. So, for example, where the fabrication ratio of a particular ceiling or wall is set to a high level, rather than rendering the ceiling as some fixed surface, the section of the TVR corresponding to the ceiling or wall may be rendered as tree branches waving in the breeze, a volume of water, held back by a force field, that is filled with dynamic virtual aquatic creatures, an open expanse with distant views, etc.

Note that in some implementations, the user may be wearing a head-mounted display or the like in combination with output devices such as headphones or speakers, and sensors such as microphones, 2D cameras, 3D depth cameras, or other imaging and/or ranging technology. These types of sensors can map or otherwise be applied to determine geometric constraints and extents of the real-world environment and pass that information to computational resources for object and scene recognition (and for use in determining semantic constraints in combination with characteristics and rules associated with virtual objects to be rendered in the TVR).

For example, in the case of preprocessing, the user can walk through her house with scanning equipment to capture scene geometry and to recognize objects. While this is generally a fully automated process, manual user input may also be used to identify or designate particular objects or spaces (e.g., a fragile vase in a room may be designated as something to be virtually highlighted in some way so that the user does not accidently knock that vase over when interacting with the TVR).

Note also that even with preprocessed environments, changes to those environments, e.g., moved objects or furniture, pets or people moving in a room, etc., can be captured and processed to incorporate those changes in real-time into the TVR. For example, assume that the user's mother is walking through a real-world room in which a user is immersed in a TVR. The user's mother can be rendered to appear as a ghost, a skeletal outline, or simply as herself so that the user doesn't bump into or otherwise interfere with her mother as she moves through the TVR that is molded and anchored to the real-world environment.

As such, the real-world capture phase generates environmental information by scanning a real-world environment to classify geometry of surfaces and objects within the environment. This real-world capture phase includes a scene understanding process that determines locations of floors, walls, doors, ceilings, objects in the space, etc. Note also that in various implementations, the Anchored Environment Generator optionally processes visible information using various image and object recognition techniques to complete missing information, such as, for example, partially visible objects behind a table.

2.2.2 Semantic Constraints:

Semantic constraints are based on a component of scene understanding that adds a deeper level of believability to characteristics of virtual objects in the TVR based on real-world environmental sensing. For example, 2D and/or 3D scans and object recognition of any real-world environment may be performed to map the geometry and recognize objects (and object features and capabilities) within that real-world environment. Depending on the available processing power, this is performed as either a pre-processing step using local or cloud-based computational resources, or is done in real-time (again using local or cloud-based computational resources) as a user enters or moves through an environment. Note also that as discussed in further detail herein, such constraints may be unitary (i.e., applying to a single virtual object), global (i.e., applying to all virtual objects or all virtual objects in some related set of virtual objects), they may apply to nearby pairs or larger groups of virtual objects, or they may apply to sets or groups of related or interacting virtual objects at any distance.

In general, the semantic constraints associated with objects detected in the scene have a set of tags or labels associated with them. These tags can belong to a taxonomy, e.g., Household→Furniture→Chair, and may also include one or more affordances such as sitting, sleeping, moveable, etc. In various implementations, these tags may also signify some importance (e.g., fragile, hot, hazardous, etc.) These labels can be used to construct semantic constraints for use by the Anchored Environment Generator. The provided dataset or theme (e.g., spaceship) has tags associated with its objects. The cost (i.e., the aforementioned cost function) of placing an object is the scene is related (via a semantic constraint) to how well the tags of the objects match the tags of the nearby objects in the real room or other real-world environment.

For example, a real table or other horizontal surface in the environment can be rendered to appear with whatever theme is being used (e.g., spaceship, ancient castle, etc.) such that the user can touch and use that table, even where it has a completely different look than the real table. In other words, the semantic constraints and affordances associated with the real table may be that virtual objects anchored to the location of the real table are intended to be placed on a corresponding virtual surface anchored to the location of that real table within the corresponding TVR, and that the user may interact with the table (e.g., set items on the table sit on the table etc.). Another simple example of a semantic constraint may be that virtual holographic displays are positioned above any table or surface with a real keyboard or other real input mechanism, or a virtual keyboard or other virtual input mechanism provided to the user to interact with virtual content on the virtual holographic displays 2.2.3 Objective Constraints:

In general, objective constraints enforce the self-consistency of the designer supplied dataset for constructing the TVR. Typically there is inherent logic to the dataset, such as constraining the number of instances of an object in a procedurally generated room (e.g., limit number of beds depending on size of room) or defining a relationship between two objects (e.g., plates and cutlery objects in a restaurant TVR are likely to be placed on a table or hutch). Additionally other objective constraints relate to the design of the experience intended to be presented via the TVR. For example, some of these objective constraints may include, but are not limited to, goal markers (e.g., start and end positions); types or behaviors of virtual adversaries (e.g., zombies in a monster-filled apocalyptic wasteland theme) that are positioned and accounted for in the generation of the TVR, as represented by constraints; physical rest locations that, when accessed by the user, may pause the rendering and display of the TVR; etc.

Simple examples of objective constraints include, but are clearly not limited to, the following objective constraints:
  Position virtual holographic displays on virtual tables or desks in the TVR;
  Place multiple virtual signs pointing to direction of an objective location (e.g., "Nuclear Reactor→");
  Positioning monster spawning points in the TVR. Note that actual spawning of monsters into the TVR at those spawning points is performed while rendering the TVR and is not itself an objective constraint;

2.3 Anchored Procedural Level Generation (APLG):

As noted above, the Anchored Environment Generator performs an optimization process for constructing an optionally themed TVR in place of a user's physical environment to match a set of real and virtual assets, rules and constraints. The resulting TVR environment retains tactile truth that at least partially matches virtual objects and surfaces to real objects and surfaces.

In general, the optimization problem can be considered from the perspective of building a virtual world (i.e., the TVR) from a large set of virtual parts (i.e., the master set or list of virtual building blocks that may include virtual 2D and 3D objects and surfaces, dynamic content including 2D and 3D animations, videos, and movies, live communication feeds, etc.), any of which can be used multiple times (and/or transformed via translation, scaling, rotation, skewing, coloring, texturing, etc.) to build the virtual world. Note that different sets of theme-based virtual objects may be used for this purpose. However, rather than randomly building a virtual world to satisfy some particular theme, the Anchored Environment Generator considers a potentially large number of constraints, e.g., which virtual objects are selected, how the selected virtual objects are transformed, the stability of the virtual world, how close the virtual world (or one or more virtual objects in that virtual world) matches the real-world environment, user safety concerns, potential user interaction with real-world services, objects, surfaces, people and animals, etc. Consequently, given the virtually limitless combinations of virtual building blocks and constraints, computing an optimal solution for constructing the TVR may be approached as an exponentially hard optimization problem.

Exponentially hard optimization problems of this type can be addressed using a variety of optimization techniques, including, but not limited to, various Markov-based processes. For example, a Markov-based optimization process may begin by evaluating a cost function or energy of the configuration of a trial solution (e.g., some initial or trial virtual object layout for TVR construction relative to the real-world environment), while examining additional nearby solutions (in some feature space) based on the assumption that other solutions that are relatively close to the trial solution are approximately as good as the trial solution. In other words, this assumes that there is some smoothness to the solution space, and that it is possible for the optimization engine to iterate and improve the current solution.

In other words, the Markov-based optimization process assumes that the quality of solutions near the trial solution does not change drastically for relatively small moves. This enables a Monte Carlo (or other statistics-based) exploration of the solution space that may begin with large moves in an attempt to locate multiple relatively good and bad trial solutions, followed by small moves around each trial solution to locate improved solutions in the space around each of the trial solutions. More specifically, Monte Carlo-based exploration methods provide a broad class of computational algorithms that rely on repeated random sampling to obtain numerical results over large numbers of simulations in order to obtain the distribution of an unknown probabilistic entity, which in the present case serves to identify an optimized solution for construction of the TVR.

For example, suppose that a subset of virtual objects $x_i$, which belong to a larger master set x of virtual objects, is to be used to simulate or reconstruct a real environment or some virtual analog of that real environment. The quality of the simulation solution can be evaluated by computing an energy of the resulting solution. The quality of that solution is evaluated by U(x), which is a combination of a unitary function over each of the virtual objects and how each of the virtual objects fit into the environment. For example, this process can determine whether a virtual table fits in the location provided by the solution, or whether there is a semantic constraint (or some other constraint) that prevents a table sitting in a particular location (such as on top of a floor lamp). For example, a small table sitting on top of large table might be a low cost (i.e., low energy), while a table sitting on a couch or a lamp might be a high cost (i.e., high energy).

The unitary nature of this analysis means that the table (or other virtual object) doesn't care about the placement of the other virtual objects that are part of the solution, only its own placement. To this is added a cost function $V(x_i, x_j)$ that gives a pairwise interaction between two neighboring objects $x_i$ and $x_j$. Similarly, larger multi-object interactions may also be considered (e.g., triplets, quadruplets, quintuplets, etc.). In other words, where two or more objects are close enough to interact, the question is whether those objects are interacting properly. For example, where two virtual objects are overlapping in the virtual space of the TVR, this is likely an improper interaction (though many exceptions exist, e.g., cases such as a virtual sword piercing a virtual monster).

Simple examples of unitary constraints for virtual objects may include, but are clearly not limited to:
Virtual trashcans belong on the floor;
Virtual lamps belong on table, desk, etc.;
Virtual windows belong in walls;
One virtual door per wall;

Simple examples of pairwise constraints may include, but are clearly not limited to:
Pairwise constraints for two or more particular virtual objects (e.g., flag and treasure chest within a predefined distance of each other);

Simple examples of global constraints for virtual objects may include, but are clearly not limited to:
No more than two virtual trashcans in a room;
Between five and seven soldiers to be arrayed around a queen;
Multiple virtual objects arrayed along some real or virtual line or surface;

Some of these global constraints may be achieved using a process based on "locally satisfiable proposals." For example, given an arbitrary dynamic environment for which conditions or characteristics are either specified by a user or determined automatically, locally satisfiable proposals may be applied to create a layout for two or more virtual objects using a solution-space exploration methodology. This methodology exploits the fact that for many types of constraints, satisfiable layout assignments can be found efficiently, in other words, these constraints are locally satisfiable. Iterative updates of the layouts of each virtual object are performed until a global cost of the constraints is minimized, or until some maximum number of iterations has been reached. This allows sampling of candidate object values from a partial probability distribution function for each constraint, to select object layouts in real-time that are consistent with the constraints, with other objects and with the environment.

In view of the preceding discussion, it should be clear that the Anchored Environment Generator supports various combinations of unitary, pairwise and global constraints. However, it should be understood that the solution space of the TVR, which consists of the virtual objects selected for use from the master set or list of virtual building blocks, and their parameters, is of unfixed dimension, meaning that during the optimization process the Anchored Environment Generator can add/remove virtual objects.

In various implementations, the TVR is produced by the Anchored Environment Generator via an iterative optimization process that includes, but is not limited to, a marked Markov point process (MMPP). As discussed in further detail below, the MMPP-based optimization process receives an input of data, including the user's environment (i.e., the real-world environment in which the TVR is to be constructed) and a set of optionally theme-based virtual building blocks (i.e., virtual objects and surfaces) from which the TVR is to be constructed. The MMPP-based optimization process then operates to find and arrange a subset of the available virtual objects from the set of virtual building blocks such that the selected subset minimizes a cost function. In other words, the cost function is the sum cost of the different constraints associated with the system (determined at runtime). Each constraint (geometric, semantic, and objective) may be evaluated for any given configuration, and return a cost (real) value. The cost function evaluating the constraints does so by examining the values of the objects involved (e.g., one if it's a unitary constraint, two if it's pairwise, etc.) relative to the characteristics of the real-world environment for which the TVR is being constructed.

For example, suppose that the TVR is intended to include a virtual couch and a virtual table, both of which the user may physically interact with, in a space station-based virtual environment. Each of these virtual objects is assigned a physical position and includes a set of parameters beyond the characteristics that defines the objects. In other words, the configuration being optimized to construct the TVR includes a set of virtual objects, where each of those objects is a "point" in the MMPP, and a set of parameters for each virtual object. Each configuration is not limited in dimensionality. So, from one step to the next during the optimization process, there may be more or fewer virtual objects (e.g., spawn or delete one or more virtual objects).

In various implementations, the MMPP optimization problem is solved using a reversible jump Monte Carlo Markov chain (RJMCMC) based process, as discussed in further detail below. In general, given a solution, RJMCMC uses a translation kernel (i.e., a "proposition kernel") to transform a current configuration (i.e., a trial solution) into a new configuration. Then, a check is performed to determine whether the new configuration has improved (e.g., lower cost, lower energy, or lower temperature). If the solution has improved, then the new configuration will likely be accepted (within some probability), or if the new configuration is worse, then it will not likely be accepted (again within some probability).

2.3.1 Point Process Overview:

In general, a point process describes random configurations of points in a continuous bounded set K where each configuration has a probability. Each configuration is a set of points (of varying number). Each point $p_i$ can be marked by additional parameters $m_i$ such that the points become associated with an object such that $x_i = (p_i, m_i)$. Therefore, a configuration may be defined as a set of virtual objects $x = \{x_1, x_2 \ldots, x_{n(x)}\}$. The energy of this relationship can be formulated as illustrated by Equation (1), where:

$$C, U(x) = \sum_{x_i \in x} D(x_i) + \sum_{x_i \sim x_j} V(x_i, x_j) \quad \text{Equation (1)}$$

Where $D(x_i)$ is a unitary data term measuring the quality of object $x_i$ and $V(x_i, x_j)$ is a pairwise term between two objects $x_i$ and $x_j$ (as noted above, relationships between greater numbers of objects may also be considered by replacing the pairwise term in Equation (1) with an appropriate relationship). In the example of Equation (1), The ~ relationship is defined via a limit distance E which specifies that points do not affect each other beyond that limit distance (e.g., movement of an object on one side of a room may be too far to affect an object on the opposite side of the room that is further away than the limit distance ϵ).

In general, the above definition of a point process is a generalization of Markov Random Fields (MRF), but with fewer restrictions on the energy types. Further, as noted above, rather than being limited to pairwise interactions, the relationships in Equation (1) may be modified to use higher-order terms (e.g. ternary, quaternary, etc.) for relationships or interactions between more than two virtual objects. In various implementations, the use of higher-order relationships may be addressed by increasing the size of parallel cells, as discussed in further detail below.

2.3.2 RJMCMC Overview:

Point processes may be simulated using processes such as RJMCMC (i.e., reversible jump Monte Carlo Markov chain) to search for a configuration which minimizes the energy U. At each iteration, the current configuration x of the single Markov chain is perturbed to configuration y using a density function $Q(x \rightarrow)$ that is referred to as a proposition kernel. In practice, x and y differ by no more than one virtual object (i.e., small moves around each trial solution or configuration), though larger numbers of objects may be used given sufficient computational resources and increased time. The new configuration is accepted with a certain probability depending on the energy variation between x and y and a relaxation parameter $T_t$ (i.e., the temperature of the chain). There are several discrete perturbations that can be chosen at each step, usually adjusting the parameters of $x_i$, and the birth or death of a virtual object. As temperature decreases, the solution (i.e., the configuration of virtual objects) generally improves. A typical process for implementing an RJMCMC sampler is shown below in Table 1:

TABLE 1

Typical RJMCMC Sampler Algorithm

1. Initialize $X_0 = x_0$ and $T_0$ at $t = 0$
2. At iteration t, with $X_t = x$,
   a. Choose a sub-kernel $Q_m$ according to $q_m$
   b. Perturb x to y according to $Q_m(x \rightarrow .)$
   c. Compute "Green ratio" as follows:

$$R = \frac{Q_m(y \rightarrow x)}{Q_m(x \rightarrow y)} \exp\left(\frac{U(x) - U(y)}{T_t}\right)$$

d. Choose $X_{t+1} = y$ with probability min(1, R), and choose $X_{t+1} = x$ otherwise.

In other words, the RJMCMC sampler algorithm receives an initial configuration at time t=0, then at each iteration, the RJMCMC sampler algorithm chooses a sub-kernel that determines how that configuration will be perturbed (e.g., move, scale, add object, delete object, etc.). Then, the RJMCMC sampler algorithm computes a ratio (i.e., the "Green ratio") that determines how good the new configuration is relative to the old configuration, dependent on temperature. Then, based on this ratio, the RJMCMC sampler algorithm chooses whether to accept or reject the new configuration. The entire algorithm is then repeatedly iterated while keeping track of the lowest energy solution found during the iterative process.

2.4 Application of Parallelism for Identifying TVR Solutions:

In various implementations, the Anchored Environment Generator applies various parallelism-based techniques for use in identifying optimal or near-optimal acceptable solutions for constructing the TVR. Use of such parallelism-based techniques have been observed to dramatically decrease the time to identify or otherwise select acceptable solutions for constructing the TVR. The following paragraphs describe some of these parallelism-based techniques in further detail.

2.4.1 Parallel Tempering:

In various implementations the Anchored Environment Generator dramatically decreases optimization time by adapting a "parallel tempering" process that runs multiple Markov chains at different temperatures while frequently exchanging configurations between chains during the sampling. After several iterations, a pair of chains are selected at random, and, with a certain probability, those chains switch their configurations. Each chain maintains its locally "optimal" solution at all times, and these are collected by the host machine.

This parallel tempering process brings robustness to the cooling process, and has been proven effective in situations where there are multiple acceptable solutions, and especially where it is useful to retrieve an acceptable solution rather than only the lowest energy solution. Advantageously, parallel tempering processes may be implemented on a modern graphics processing unit (GPU) by taking advantage of the parallel nature of such processors.

2.4.2 Distance-Based Parallel Sampling:

In various implementations, the Anchored Environment Generator further decreases optimization time by adapting parallel sampling techniques for use in the optimization process. In general, parallel sampling provides a way to parallelize the sampling at each iteration of the chain. The method relies on the Markov principle and the existence of $\epsilon$, i.e., the distance between two objects (in different cells) beyond which perturbation on one does not affect the other.

2.4.3 Influence Group-Based Parallel Sampling:

Unfortunately, distance-based parallel sampling, as discussed above in Section 2.4.2, is not applicable for cases where objects have effect on each other regardless of distance. As such, in various implementations, interactions between virtual objects are handled by determining "influence groups". In particular, where it is known that two or more objects influence each other, instead of building a grid, as discussed above with respect to distance-based parallel sampling, the Anchored Environment Generator builds a more complicated structure between related groups of objects that enables the use of "constraint-based parallel sampling."

2.5 Exemplary Algorithms for TVR Construction:

In further implementations, the Anchored Environment Generator uses various combinations of the techniques and processes described above to construct the TVR environment. The following paragraphs describe an exemplary implementation of several algorithms for constructing the TVR based on those techniques and processes for purposes of explanation. It should be understood that the algorithms described below incorporate only a few of the many concepts and implementations discussed herein and that these algorithms are not intended to limit the scope of the Anchored Environment Generator to the specific steps or capabilities of the algorithms.

In general, one of the many possible implementations for generating the TVR begins by receiving an input of initial parameters. These initial parameters include, but are not limited to, a virtual object master list (also referred to herein as the master set of virtual building blocks), one or more constraints that are to be applied when generating the TVR, an initial configuration, and environmental information derived from the real-world environment for which the TVR is to be rendered. Given this input, the Anchored Environment Generator outputs one or configurations that describe the parameters of the TVR that is then rendered for presentation to the user.

More specifically, the virtual object master list generally provides a set of virtual building blocks (i.e., virtual objects and any models, textures, constraints, etc., used for rendering those virtual objects) that are available for use in constructing the TVR. The individual virtual building blocks include a variety of parameters and characteristics, including, but not limited to, object names or IDs, object geometry, object model parameters, object bounding boxes, initial transformations (e.g., translation, scaling, rotation, skewing, coloring, texturing, etc.), constraints, etc.

In various implementations, these virtual building blocks may be limited to a particular user selected or specified theme. In other words, a TVR for the same real-world environment can correspond to any of a plurality of user specified or selected themes. Examples of such themes include, but are clearly not limited to, a French bistro, space station, starship, alternate real-world environments, alien world, apocalyptic wasteland, medieval village, hospital, castle, etc.

The aforementioned constraints that are to be applied when generating the TVR include, but are not limited to unitary constraints, pairwise constraints, influence group based constraints, global constraints, etc.

In general, unitary constraints include, but are not limited to, properties that apply to specific virtual object IDs, one or more instances of such objects, or all virtual objects. In various implementations, these properties may also include a specified "Type" and one or more "Parameters." Simple examples of unitary constraints may include, but are clearly not limited to, limiting object scale, e.g., [0.7-1.2], limiting object rotation, e.g., only rotations around the Y (up) axis, specifying that a particular object is to be attached to the floor or wall, that it requires some sort of support (i.e., can't float in the air), etc., overlap environment, semantic similarity to environment, etc.

Simple examples of pairwise constraints may include, but are clearly not limited to, implicit constraints (e.g., avoid collisions with other virtual objects), explicit constraints (e.g. certain distance between objects), etc. Simple examples of global constraints may include, but are clearly not limited to, a percentage of environment covered, a limit on types of objects (e.g., no more than one sofa, no more than two windows, etc.), etc.

In general, the aforementioned initial configuration includes, but is not limited to, a list of virtual object instances, each of which may have properties, including, but not limited to, an instance ID, an object ID (i.e., link to virtual object in the object master list), an initial transformation, a static flag (i.e., can't be removed if flag is set), etc. Further, many of these properties of objects for the initial configuration may be related to objective constraints, i.e., they may be an integral part of the experience or theme intended to be presented to the user via the TVR.

Finally, the environmental information derived from the real-world environment includes, but is clearly not limited to, scene geometry, inferred scene layout (floors, walls, etc.), real-world objects, people, animals, etc., in the environment, control objects in the environment (e.g., controls such as light switches, power buttons, remote controls, etc.), and semantics relating the real-world environment and real things within that real-world environment.

As noted above, given the inputs described above, the Anchored Environment Generator output one or more TVR configurations (as desired), having the same structure as the initial configuration, and a score for determining a quality of the configuration. In general, when applying an MMPP-based optimization process, a TVR optimization process consists of one or more Markov chains operating in parallel. Each chain maintains an active configuration. In each iteration of each chain, the following processes are performed:

1. Perturb the current configuration to create a new configuration; and
2. Either accept or reject the new configuration according to chain temperature (i.e., energy) and ratio of cost (probability) between the current and the new configuration.

A chain can be made "independent" in which case it cools down (i.e., lower energy) over time to achieve a stable distribution, or "parallel" (i.e., parallel tempering, as discussed above) in which case the temperature of that chain is fixed, and the Anchored Environment Generator acts to switch configurations between chains and store results. Each chain is a function or kernel that performs the following steps:
1. Initialization:
   a. Create a set of separable cells in the environment (dependent on geometry and temperature of the chain); and
   b. Create position seeds for each object in the master set of virtual objects to sample from;
2. Iteration:
   a. Select a set of cells and an operation, sample an object in each cell; and
   b. Evaluate and decide to accept or reject the change based on the resulting temperature.

In further implementations, algorithms for constructing the TVR may include, but are not limited to, the following inputs:
1. Reconstructed scene (e.g., 3D mesh or model representing real-world environment);
2. Detection of room layout elements (e.g., floor, ceiling, walls, doors, etc.);
3. Semantic object detection, supplied as one of:
   a. Models in a dataset of virtual objects with transformations into the virtual space afforded by the corresponding real-world environment;
   b. Heat-maps over the scene volume (max values where a virtual object is most likely);
4. Virtual object master list or theme-based set of virtual objects (e.g., spaceship, hospital, village, etc.); and
5. A set of constraints.

Given the immediately preceding inputs, a "scene layout inference algorithm" begins the process of constructing the TVR from the scene and room layout inputs by constructing a water-tight (i.e., enclosed space) representation of the environment. Note that this representation is not based on the TVR itself, it is simply an inference on the layout of the environment in the real world. In various implementations, the representation may be a set of planes, each labeled as floor, wall, ceiling, etc., all of which are guaranteed to be adjacent to another plane on all edges (therefore enclosed). Additional properties for each plane can signify a portal (e.g., window, door, etc.). In various implementations, larger real-world environments (e.g., houses, buildings, etc.) may be further segmented into rooms. Given this information, in various implementations, the Anchored Environment Generator casts the optimization problem into 2D (e.g., the set of detected walls are projected unto the detected floor plane). An initial guess for the layout is a closed polygon that is a convex polygon surrounding the observed environment. The elements to be optimized by the scene layout inference algorithm may then include:
1. Minimize number of walls (keeps it to a simple shape);
2. Walls are either orthogonal or parallel (heuristic about typical man-made environments);
3. Walls "stick" to observed walls (for tactile truth);
4. Elements of the scene observed in the surface reconstruction may be enclosed by the polygon (keeps it from shrinking during the optimization process);
5. Optimize the polygon via a reversible jump Monte Carlo Markov chain (RJMCMC).

The Anchored Environment Generator then applies an "interior optimization algorithm" to procedurally generate the TVR from the aforementioned inputs in combination with the output from the scene layout inference algorithm. In general, the interior optimization algorithm first generates a set of candidate positions for each object in the virtual object master list or theme-based set of virtual objects. This is done by a modified object detection algorithm that runs mostly on the GPU. In various implementations, object detection techniques are applied to construct a dense signature for each virtual object using a large number of point pairs. For each point pair, features are calculated and then hashed. Given a scene, the interior optimization algorithm then extracts a number of reference points and attempts to find matches (via the hashes) in the dense object signatures. The highest quality matches are then used to produce transformations that place the virtual objects into candidate positions in the TVR.

Given the candidate positions for the virtual objects, the Anchored Environment Generator then applies an additional optimization algorithm, similar to the aforementioned scene layout inference algorithm, for the constraints supplied with the virtual object master list or theme-based set of virtual objects. However, in this case, the moves in each iteration of the RJMCMC are dictated by the candidate positions. The output of this final optimization algorithm is an acceptable solution for rendering the TVR.

2.6 Exemplary Usage Scenarios:

As discussed herein, in various implementations, the Anchored Environment Generator provides full control over every pixel of the physically constrained virtual environment that is visible to the user, thereby creating a fully immersive experience that may or may not include renderings of real-world elements. In other words, the Anchored Environment Generator combines real-world environments with virtual reality in a way that maps a virtual reality environment to objects, geometry, people, etc., within a real-world space. These features provide tactile truth to the resulting physically constrained virtual environment being presented to the user by the Anchored Environment Generator without actually displaying the underlying real-world environment, thereby enabling virtually limitless usage scenarios.

The following paragraphs describe various examples of some of the many ways in which the TVR constructed by the Anchored Environment Generator may be implemented and presented for user interaction. It should be understood that the various examples described below are presented only for purposes of providing a general understanding of a few of the virtually limitless usage scenarios enabled by the TVR, and that these examples are not intended to limit the scope of the Anchored Environment Generator to the examples provided.

For example, individual (but related) TVR's for an entire floor of real-world rooms may be constructed to look like scenes or rooms from a famous movie or book relating to wizards and magic schools. Real paper scrolls can then be placed in different real-world locations (and rendered as virtual scrolls in corresponding locations in the TVR). Users can then pick up and unroll those virtual scrolls (via the corresponding real scrolls). Virtual content (including combinations of static and dynamic content) can then be rendered onto those scrolls within the TVR. Similarly, virtual scrolls can float in the air in different locations and then open up and display content in response to the user (e.g., when the user approaches, speaks a command, virtually touches or gestures with her hand or wand, etc.).

Continuing the above example, pens, pencils, sticks or other real objects carried by the user may be rendered into the TVR to appear as magic wands or other magical items. Further, virtual special effects can be displayed as emanating from those real objects being carried by the user that appear to the user as magic wands or other magic items. In addition, audio from any combination of real characters (i.e., other users in the same real-world environment or linked from other remote environments) or virtual characters in the TVR can also be presented. In combination, such effects serve to complete a tactile, visual, and audible illusion that makes the user feel, see, and hear, the world around her as if she was actually in the magical world and interacting with magic wands and magic scrolls in the presence of, and optionally interacting with, multiple other persons or characters that may themselves be real persons, virtual representations of real persons, or fully virtual persons.

In various implementations, a single real-world room or space can be presented to the user as many different TVR-based or environments. For example, a real doorway, closet, or open space in the real-world environment can be rendered to appear as a virtual transport mechanism such as an elevator, teleportation pad, etc., within the TVR. The user can then make use of the virtual transport mechanism by stepping into that space, and optionally issuing verbal or gestural commands or other inputs. The user will then be virtually transported to a new space by simply re-rendering the room or space that the user is already in using a different TVR. However, it may be necessary for the user to physically turn around to view the new TVR after the virtual transport, assuming that the user has walked into a small space such as a real closet or room corner that acts as the virtual transporter in the TVR. In other words, walk into a real closet in one TVR, then turn around and exit the closet to enter new a TVR, optionally following additional virtual transport special effects displayed in one or both TVR's. Such processes can be performed repeatedly in a way that allows a user to move around in a single small or limited physical space (or some extended space or multiple spaces) while it appears to the user as if she were in a much larger sequence of different spaces.

Figure 3:
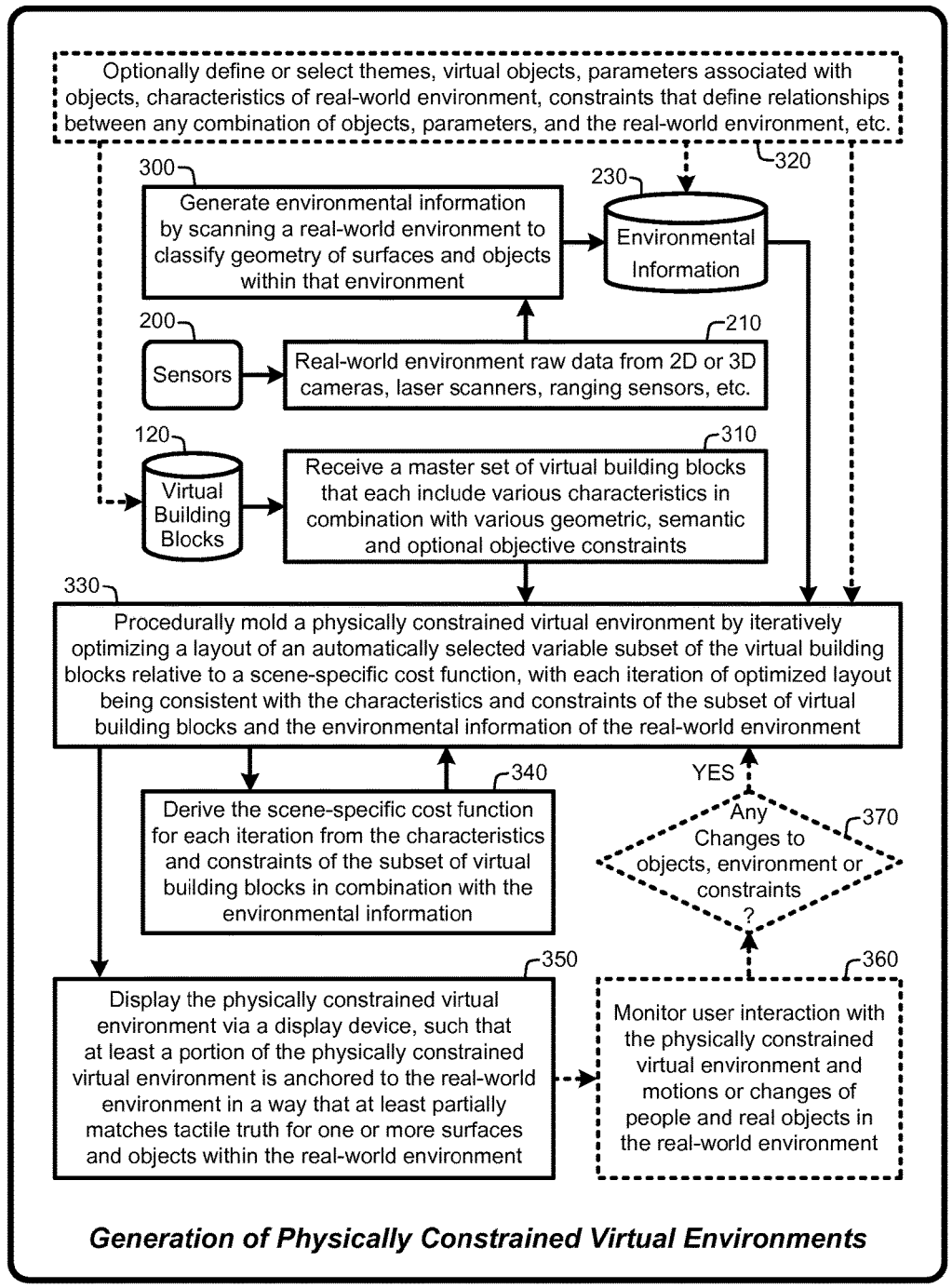
FIG. 3 illustrates a general system flow diagram that illustrates exemplary methods for effecting various implementations of the Anchored Environment Generator, as described herein.
Figure 4:
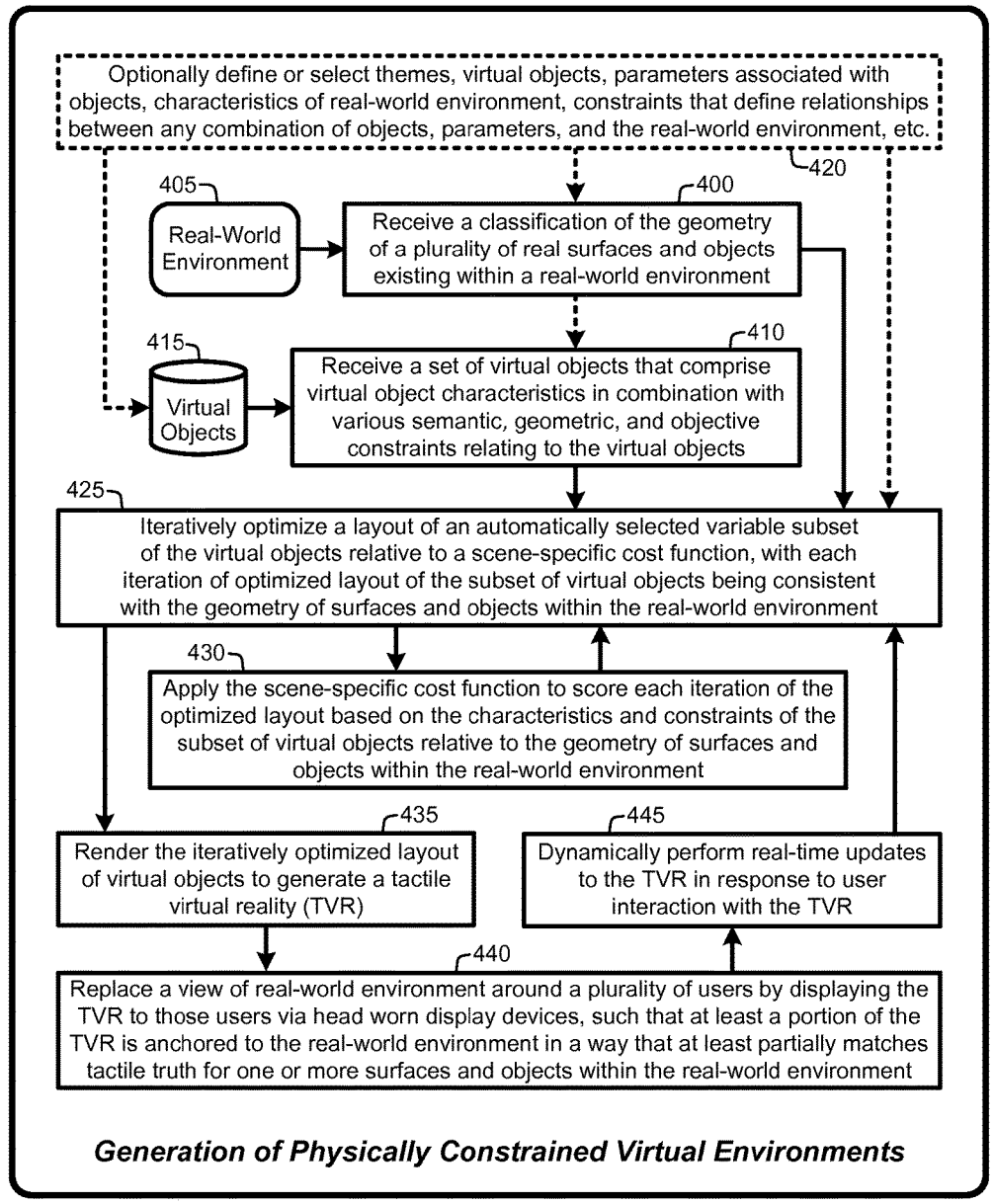
FIG. 4 illustrates a general system flow diagram that illustrates exemplary methods for effecting various implementations of the Anchored Environment Generator, as described herein.
Figure 5:
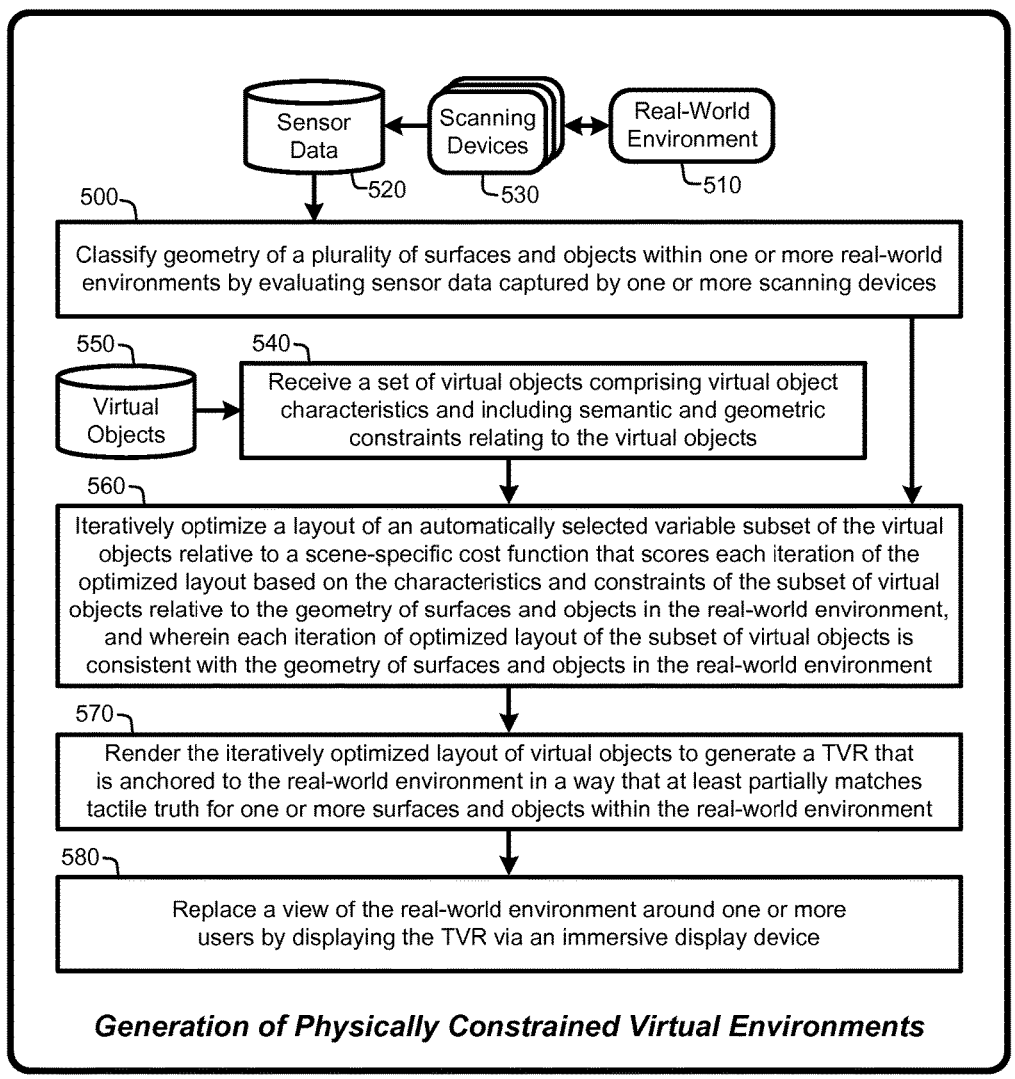
FIG. 5 illustrates a general system flow diagram that illustrates exemplary methods for effecting various implementations of the Anchored Environment Generator, as described herein.

3.0 Operational Summary of the Anchored Environment Generator:

The processes described above with respect to FIG. 1 through FIG. 2, and in further view of the detailed description provided above in Sections 1 and 2, are illustrated by the general operational flow diagrams of FIG. 3 through FIG. 5. In particular, FIG. 3 through FIG. 5 provide alternate implementations of exemplary operational flow diagrams that summarize the operation of some of the various implementations of the Anchored Environment Generator. Note that FIG. 3 through FIG. 5 are not intended to provide exhaustive representations of all of the various implementations of the Anchored Environment Generator described herein, and that the implementations represented in FIG. 3 through FIG. 5 are provided only for purposes of explanation.

Further, it should be noted that any boxes and interconnections between boxes that are represented by broken or dashed lines in any of FIG. 3 through FIG. 6 represent optional or alternate implementations of the Anchored Environment Generator described herein, and that any or all of these optional or alternate implementations, as described below, may be used in combination with other alternate implementations that are described throughout this document, In general, as illustrated by FIG. 3, in various implementations, the Anchored Environment Generator begins operation by scanning any desired real-world environment using a plurality of sensors 200 to produce real-world environmental raw data 210. The Anchored Environment Generator then generates (300) environmental information by 230 from the real-world environmental raw data 210 by classifying geometry of surfaces and objects within the real-world environment.

A master set of virtual building blocks 120 is then specified (310) or otherwise selected, provided, or received for use in generating the TVR. In general, this master set of virtual building blocks 120 includes a plurality of virtual building blocks that each include various characteristics in combination with various geometric, semantic and optional objective constraints. Further, in various implementations, the user or developer may optionally define (320) or select themes, virtual objects, parameters associated with virtual objects, characteristics of the real-world environment, constraints that define relationships between any combination of objects, parameters, and the real-world environment, etc.

The Anchored Environment Generator then procedurally molds (330) a physically constrained virtual environment by iteratively optimizing a layout of an automatically selected variable subset of the virtual building blocks relative to a scene-specific cost function, with each iteration of optimized layout being consistent with the characteristics and constraints of the subset of virtual building blocks and the environmental information of the real-world environment. The Anchored Environment Generator derives (340) the scene-specific cost function for each iteration from the characteristics and constraints of the subset of virtual building blocks 120 in combination with the environmental information 230.

The Anchored Environment Generator then displays (350) the physically constrained virtual environment via a display device, such that at least a portion of the physically constrained virtual environment is anchored to the real-world environment in a way that at least partially matches tactile truth for one or more surfaces and objects within the real-world environment.

In addition, in various implementations, the Anchored Environment Generator continues by optionally monitoring (360) user interaction with the physically constrained virtual environment and optionally monitors motions or changes of people and real objects in the real-world environment. The purpose of such monitoring is to determine whether there are any changes (370) to any real or virtual objects, any changes to the real-world environment, or any changes to any of the constraints. In the event that any such changes are detected, the physically constrained virtual environment is dynamically updated in real-time by repeating the procedural molding and display processes (i.e., 330, 340, and 350) in a way that accounts for some or all of the observed changes.

In general, as illustrated by FIG. 4, in various implementations, the Anchored Environment Generator begins operation by receiving (400) a classification of the geometry of a plurality of real surfaces and objects existing within a real-world environment 405. In addition, the Anchored Environment Generator receives (410) a set of virtual objects 415 that comprise virtual object characteristics in combination with various semantic, geometric, and objective constraints relating to the virtual objects. In addition, in various implementations, a user interface or the like is provided to enables users or developers to optionally define (420) or select themes, virtual objects, parameters associated with objects, characteristics of real-world environment, constraints that define relationships between any combination of objects, parameters, and the real-world environment, etc.

Next, in various implementations, the Anchored Environment Generator iteratively optimizes (435) a layout of an automatically selected variable subset of the virtual objects relative to a scene-specific cost function, with each iteration of optimized layout of the subset of virtual objects 415 being consistent with the geometry of surfaces and objects within the real-world environment 405. During this iterative process, the Anchored Environment Generator applies (430) the scene-specific cost function to score each iteration of the optimized layout based on the characteristics and constraints of the subset of virtual objects 415 relative to the geometry of surfaces and objects within the real-world environment 405.

The Anchored Environment Generator then renders (435) the iteratively optimized layout of virtual objects 415 to generate a tactile virtual reality (TVR). The Anchored Environment Generator then replaces (440) a view of real-world environment around a plurality of users by displaying the TVR to those users via head worn display devices, such that at least a portion of the TVR is anchored to the real-world environment in a way that at least partially matches tactile truth for one or more surfaces and objects within the real-world environment. Finally, the Anchored Environment Generator dynamically perform real-time updates 445 to the TVR in response to user interaction with the TVR.

In general, as illustrated by FIG. 5, in various implementations, the Anchored Environment Generator begins operation by classifying (500) geometry of a plurality of surfaces and objects within one or more real-world environments 510 by evaluating sensor data 520 captured by one or more scanning devices 530.

The Anchored Environment Generator then receives a set of virtual objects 550 comprising virtual object characteristics and including semantic and geometric constraints relating to the virtual objects. The Anchored Environment Generator then uses this information to iteratively optimize (560) a layout of an automatically selected variable subset of the virtual objects 550 relative to a scene-specific cost function that scores each iteration of the optimized layout based on the characteristics and constraints of the subset of virtual objects relative to the geometry of surfaces and objects in the real-world environment. Note that each iteration of optimized layout of the subset of virtual objects is consistent with the geometry of surfaces and objects in the real-world environment 510.

The Anchored Environment Generator then renders (570) the iteratively optimized layout of virtual objects to generate a tactile virtual reality (TVR) that is anchored to the real-world environment 510 in a way that at least partially matches tactile truth for one or more surfaces and objects within the real-world environment. Finally, in various implementations, the Anchored Environment Generator replaces (580) a view of the real-world environment 510 around one or more users by displaying the TVR via an immersive display device.

4.0 Exemplary Implementations:

The following paragraphs summarize various examples of implementations that may be claimed in the present document. However, it should be understood that the implementations summarized below are not intended to limit the subject matter that may be claimed in view of the detailed description of the Anchored Environment Generator. Further, any or all of the implementations summarized below may be claimed in any desired combination with some or all of the implementations described throughout the detailed description and any implementations illustrated in one or more of the figures, and any other implementations and examples described below. In addition, it should be noted that the following implementations and examples are intended to be understood in view of the detailed description and figures described throughout this document.

In various implementations, an Anchored Environment Generator is implemented by means, processes or techniques for generating a physically constrained virtual environment that is molded and anchored to a real-world environment around a user in a way that at least partially matches tactile truth for one or more surfaces and objects within the real-world environment. Consequently, presentation of the physically constrained virtual environment improves user experience and interaction performance within virtual environments by allowing users to move within and to physically interact with virtual environments that are molded and anchored to real-world environments without actually displaying the real-world environment to the user. In addition, user safety and safety of other people and objects within the real-world environment are also improved by molding and anchoring the TVR to the real-world environment, and by providing various mechanisms for interacting with real-world objects while users are immersed in the TVR.

As a first example, in various implementations, a computer-implemented process is provided via means, processes or techniques for constructing virtual environments. In various implementations, construction of such virtual environment begins by generating environmental from scans of a real-world environment to classify geometry of surfaces and objects within that environment. In combination, a master set of virtual building blocks is provided. Each of these virtual building blocks includes a plurality of characteristics along with various semantic and geometric constraints relating to the virtual building blocks. Construction of the virtual environment continues by procedurally molding a physically constrained virtual environment through an iterative optimization of a layout of an automatically selected variable subset of the virtual building blocks relative to a scene-specific cost function. Further, each iteration of optimized layout of the physically constrained virtual environment is consistent with the characteristics and constraints of the subset of virtual building blocks, and the environmental information of the real-world environment. In addition, the scene-specific cost function being is for each iteration from the characteristics and constraints of the subset of virtual building blocks in combination with the environmental information. Finally, the physically constrained virtual environment is displayed or presented via a display device, such that at least a portion of the physically constrained virtual environment is anchored to the real-world environment in a way that at least partially matches tactile truth for one or more surfaces and objects within the real-world environment.

As a second example, in various implementations, the first example is further modified via means, processes or techniques for rendering virtual representations of one or more real-world objects into the physically constrained virtual environment to enable one or more users to interact with those real-world objects.

As a third example, in various implementations, any of the first example and the second example are further modified via means, processes or techniques for enabling user interaction with the physically constrained virtual environment via speech-based commands.

As a fourth example, in various implementations, any of the first example, the second example, and the third example, are further modified via means, processes or techniques for enabling user interaction with the physically constrained virtual environment via gesture-based commands.

As a fifth example, in various implementations, any of the first example, the second example, the third example, and the fourth example, are further modified via means, processes or techniques for rendering a virtual object into a user's hand within the physically constrained virtual environment.

As a sixth example, in various implementations, any of the first example, the second example, the third example, the fourth example, and the fifth example, are further modified via means, processes or techniques for rendering a virtual object to at least partially match tactile truth of a real object held in a user's hand within the physically constrained virtual environment.

As a seventh example, in various implementations, any of the first example, the second example, the third example, the fourth example, the fifth example, and the sixth example, are further modified via means, processes or techniques for dynamically updating the physically constrained virtual environment in response to interaction by one or more users with one or more of the virtual building blocks of the physically constrained virtual environment.

As an eighth example, in various implementations, any of the first example, the second example, the third example, the fourth example, the fifth example, the sixth example, and the seventh example, are further modified via means, processes or techniques for dynamically updating the physically constrained virtual environment in response to movement of one or more users within the real-world environment.

As a ninth example, in various implementations, any of the first example, the second example, the third example, the fourth example, the fifth example, the sixth example, the seventh example, and the eighth example, are further modified via means, processes or techniques for dynamically updating the physically constrained virtual environment in response to movement of one or more real objects within the real-world environment.

As a tenth example, in various implementations, any of the first example, the second example, the third example, the fourth example, the fifth example, the sixth example, the seventh example, the eighth example, and the ninth example, are further modified via means, processes or techniques for applying a marked Markov point process that evaluates the scene-specific cost function to score each iteration of the optimized layout of the physically constrained virtual environment As an eleventh example, in various implementations, any of the first example, the second example, the third example, the fourth example, the fifth example, the sixth example, the seventh example, the eighth example, the ninth example, and the tenth example, are further modified via means, processes or techniques for limiting the automatically selected variable subset of the virtual building blocks to a theme-based specification.

As a twelfth example, in various implementations, any of the first example, the second example, the third example, the fourth example, the fifth example, the sixth example, the seventh example, the eighth example, the ninth example, the tenth example, and the eleventh example, are further modified via means, processes or techniques for ensuring that each iteration of the optimized layout of the physically constrained virtual environment is also consistent with one or more objective constraints.

As a thirteenth example, in various implementations, a method is provided via means, processes or techniques for generating immersive virtual environments. In various implementations, this generation of immersive virtual environments begins by receiving a classification of geometry of surfaces and objects within a real-world environment in combination with a set of virtual objects comprising virtual object characteristics and including semantic, geometric, and objective constraints relating to the virtual objects. Generation of the immersive virtual environments then continues by iteratively optimizing a layout of an automatically selected variable subset of the virtual objects relative to a scene-specific cost function. In addition, each iteration of optimized layout of the subset of virtual objects is consistent with the geometry of surfaces and objects within the real-world environment. Further, the scene-specific cost function scores each iteration of the optimized layout based on the characteristics and constraints of the subset of virtual building blocks relative to the geometry of surfaces and objects within the real-world environment. Next, a tactile virtual reality (TVR) is generated by rendering the iteratively optimized layout of virtual objects. In various implementations, this TVR is then used to replace a view of the real-world environment around a plurality of users by displaying the TVR to those users via head worn display devices, such that at least a portion of the TVR is anchored to the real-world environment in a way that at least partially matches tactile truth for one or more surfaces and objects within the real-world environment. Finally, in various implementations, real-time updates to the TVR are dynamically performed in response to user interaction with the TVR.

As a fourteenth example, in various implementations, the thirteenth example is further modified via means, processes or techniques for rendering virtual representations of one or more real-world objects that exist within the real-world environment into corresponding locations within the TVR so that the virtual representations at least partially match tactile truth of the corresponding real-world objects.

As a fifteenth example, any of the thirteenth example and the fourteenth example, are further modified via means, processes or techniques for applying one or more natural user interface (NUI) processes to enable user interaction with the TVR via any combination of speech-based commands, gestures, and facial expressions.

As a sixteenth example, any of the thirteenth example, the fourteenth example, and the fifteenth example, are further modified via means, processes or techniques for rendering a virtual object to at least partially match tactile truth of a real object held in a user's hand within the TVR.

As a seventeenth example, any of the thirteenth example, the fourteenth example, the fifteenth example, and the sixteenth example, are further modified via means, processes or techniques for dynamically updating the TVR in real-time in response to movement of one or more real objects within the real-world environment corresponding to the TVR.

As an eighteenth example, any of the thirteenth example, the fourteenth example, the fifteenth example, the sixteenth example, and the seventeenth example are further modified via means, processes or techniques for automatically selecting the variable subset of the virtual objects to be consistent with a theme-based specification.

As a nineteenth example, in various implementations, a method is provided via means, processes or techniques for generating tactile virtual realities by providing computer executable instructions that cause a computing device to automatically classify geometry of surfaces and objects within a real-world environment in response to environmental information received from one or more scanning devices. In addition, these computer-executable instructions cause the computer to receive a set of virtual objects comprising virtual object characteristics and including semantic and geometric constraints relating to the virtual objects. The computer-executable instructions further cause the computer to iteratively optimize a layout of an automatically selected variable subset of the virtual objects relative to a scene-specific cost function that scores each iteration of the optimized layout based on the characteristics and constraints of the subset of virtual building blocks relative to the geometry of surfaces and objects within the real-world environment. Further, each iteration of optimized layout of the subset of virtual objects is consistent with the geometry of surfaces and objects within the real-world environment. The computer-executable instructions then cause the computer to render the iteratively optimized layout of virtual objects to generate a tactile virtual reality (TVR) that is anchored to the real-world environment in a way that at least partially matches tactile truth for one or more surfaces and objects within the real-world environment. Finally, the computer-executable instructions cause the computer to replace a view of the real-world environment around one or more users by displaying the TVR via an immersive display device.

As a twentieth example, in various implementations, the nineteenth example is further modified further modified via means, processes or techniques for dynamically performing real-time updates to the TVR in response to any user interactions with any virtual objects in the TVR and any real objects within the real-world environment corresponding to the TVR.

Figure 6:
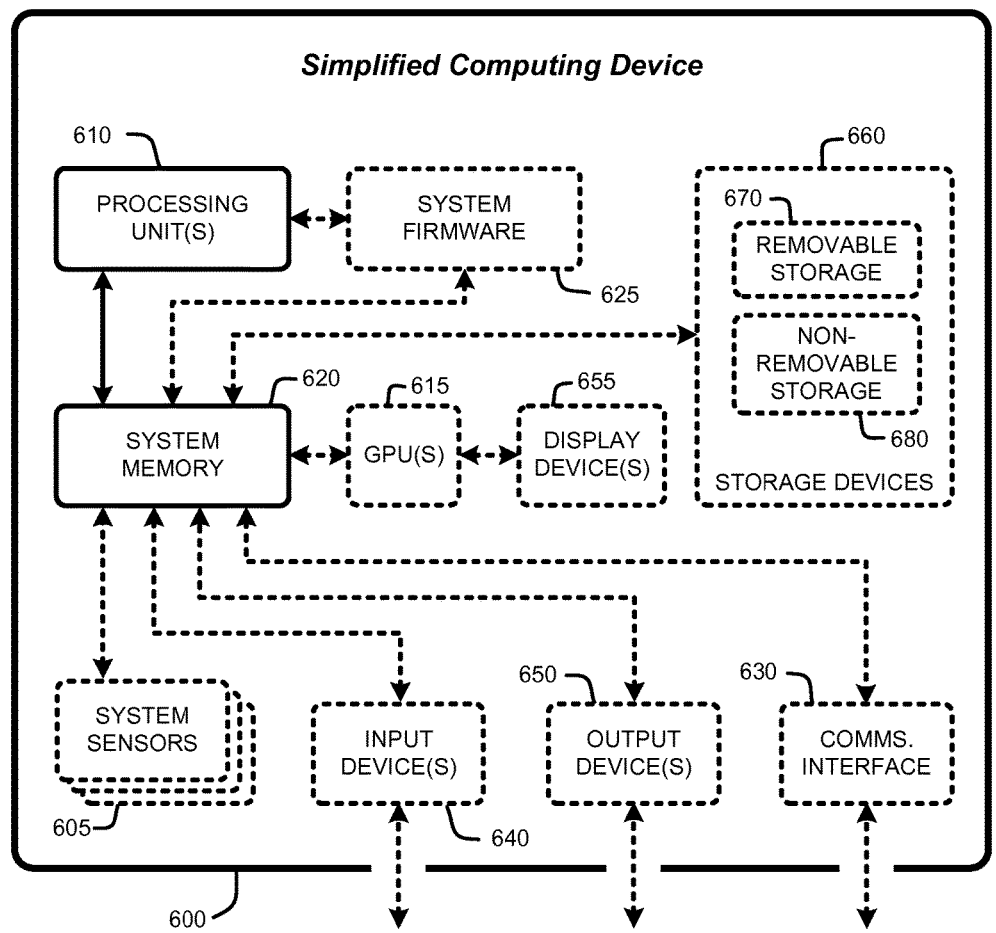
FIG. 6 is a general system diagram depicting a simplified general-purpose computing device having simplified computing and I/O capabilities for use in effecting various implementations of the Anchored Environment Generator, as described herein.

5.0 Exemplary Operating Environments:

The Anchored Environment Generator implementations described herein are operational within numerous types of general purpose or special purpose computing system environments or configurations. FIG. 6 illustrates a simplified example of a general-purpose computer system on which various implementations and elements of the Anchored Environment Generator, as described herein, may be implemented. It is noted that any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Anchored Environment Generator implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. Note that that the processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a communications interface 630. The simplified computing device 600 may also include one or more conventional computer input devices 640 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 600 and with any other component or feature of the Anchored Environment Generator, including input, output, control, feedback, and response to one or more users or other devices or systems associated with the Anchored Environment Generator, are enabled by a variety of Natural User Interface (NUI) scenarios. The NUI techniques and scenarios enabled by the Anchored Environment Generator include, but are not limited to, interface technologies that allow one or more users user to interact with the Anchored Environment Generator in a "natural" manner, free from artificial constraints imposed by input devices such as mice, keyboards, remote controls, and the like.

Such NUI implementations are enabled by the application of various techniques including, but not limited to, using NUI information derived from user speech or vocalizations captured via microphones or other input devices 640 or system sensors 605. Such NUI implementations are also enabled by the application of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the application of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Anchored Environment Generator.

However, it should be understood that the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Anchored Environment Generator.

The simplified computing device 600 may also include other optional components such as one or more conventional computer output devices 650 (e.g., display device(s) 655, audio output devices, video output devices, devices for transmitting wired or wireless data transmissions, and the like). Note that typical communications interfaces 630, input devices 640, output devices 650, and storage devices 660 for general-purpose computers are well known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Anchored Environment Generator implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 625, hardware, or any combination thereof to control a computer to implement the disclosed subject matter. The term "article of manufacture" as used herein is intended to encompass a computer program accessible from any computer-readable device, or media.

The Anchored Environment Generator implementations described herein may be further described in the general context of computer-executable instructions, such as program modules, being executed by a computing device. Generally, program modules include routines, programs, objects, components, data structures, and the like, that perform particular tasks or implement particular abstract data types. The Anchored Environment Generator implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Anchored Environment Generator has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the Anchored Environment Generator. It is intended that the scope of the Anchored Environment Generator be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Anchored Environment Generator described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

What is claimed is:

1. A computer-implemented process for constructing virtual environments, comprising:
    using a computer to perform process actions for:
    generating environmental information by scanning a real-world environment to classify geometry of surfaces and objects within that environment;
    receiving a master set of virtual building blocks, each virtual building block including a plurality of characteristics and including semantic and geometric constraints relating to the virtual building blocks;
    procedurally molding a physically constrained virtual environment by performing two or more iterations of a joint optimization of a layout of an automatically selected variable subset of at least two of the virtual building blocks selected for each iteration relative to a scene-specific cost function;
    each iteration of the physically constrained virtual environment comprising a different trial solution of a joint layout of all the virtual building blocks in the automatically selected variable subset;
    each iteration being consistent with the characteristics and constraints of the variable subset of virtual building blocks and the environmental information of the real-world environment;
    the scene-specific cost function being derived for each iteration from the characteristics and constraints of the subset of virtual building blocks in combination with the environmental information;
    displaying the physically constrained virtual environment via a display device, such that at least a portion of the physically constrained virtual environment is anchored to the real-world environment in a way that at least partially matches tactile truth for one or more surfaces and objects within the real-world environment.

2. The computer-implemented process of claim 1 further comprising process actions for rendering virtual representations of one or more real-world objects into the physically constrained virtual environment to enable one or more users to interact with those real-world objects.

3. The computer-implemented process of claim 1 further comprising process actions for enabling user interaction with the physically constrained virtual environment via speech-based commands.

4. The computer-implemented process of claim 1 further comprising process actions for enabling user interaction with the physically constrained virtual environment via gesture-based commands.

5. The computer-implemented process of claim 1 further comprising process actions for rendering a virtual object into a user's hand within the physically constrained virtual environment.

6. The computer-implemented process of claim 1 further comprising process actions for rendering a virtual object to at least partially match tactile truth of a real object held in a user's hand within the physically constrained virtual environment.

7. The computer-implemented process of claim 1 further comprising process actions for dynamically updating the physically constrained virtual environment in response to interaction by one or more users with one or more of the virtual building blocks of the physically constrained virtual environment.

8. The computer-implemented process of claim 1 further comprising process actions for dynamically updating the physically constrained virtual environment in response to movement of one or more users within the real-world environment.

9. The computer-implemented process of claim 1 further comprising process actions for dynamically updating the physically constrained virtual environment in response to movement of one or more real objects within the real-world environment.

10. The computer-implemented process of claim 1 further comprising process actions for applying a marked Markov point process that evaluates the scene-specific cost function to score each iteration of the jointly optimized layout of the physically constrained virtual environment.

11. The computer-implemented process of claim 1 further comprising process actions for limiting the automatically selected variable subset of the virtual building blocks to a theme-based specification.

12. The computer-implemented process of claim 1 wherein each iteration of the jointly optimized layout of the physically constrained virtual environment is also consistent with one or more objective constraints.

13. A method for generating an immersive virtual environment, comprising:

receiving a classification of geometry of surfaces and objects within a real-world environment;

receiving a set of virtual objects comprising virtual object characteristics and including semantic, geometric, and objective constraints relating to the virtual objects;

iteratively jointly optimizing, via two or more iterations, a layout of an automatically selected variable subset of at least two of the virtual objects selected for each iteration relative to a scene-specific cost function;

each iteration of the subset of virtual objects comprising a different trial solution of a joint layout of all of the virtual objects in the automatically selected variable subset of virtual objects;

each iteration being consistent with the geometry of surfaces and objects within the real-world environment;

wherein the scene-specific cost function scores each iteration of the jointly optimized layout based on the characteristics and constraints of the subset of virtual objects relative to the geometry of surfaces and objects within the real-world environment;

rendering the iteratively jointly optimized layout of virtual objects to generate a tactile virtual reality (TVR);

replacing a view of the real-world environment around a plurality of users by displaying the TVR to those users via head worn display devices, such that at least a portion of the TVR is anchored to the real-world environment in a way that at least partially matches tactile truth for one or more surfaces and objects within the real-world environment; and dynamically performing real-time updates to the TVR in response to user interaction with the TVR.

14. The method of claim 13 further comprising rendering virtual representations of one or more real-world objects that exist within the real-world environment into corresponding locations within the TVR so that the virtual representations at least partially match tactile truth of the corresponding real-world objects.

15. The method of claim 13 further comprising applying one or more natural user interface (NUI) processes to enable user interaction with the TVR via any combination of speech-based commands, gestures, and facial expressions.

16. The method of claim 13 further comprising rendering a virtual object to at least partially match tactile truth of a real object held in a user's hand within the TVR.

17. The method of claim 13 further comprising dynamically updating the TVR in real-time in response to movement of one or more real objects within the real-world environment corresponding to the TVR.

18. The method of claim 13 further comprising automatically selecting the variable subset of the virtual objects to be consistent with a theme-based specification.

19. A computer-readable storage device having computer executable instructions stored therein, said instructions causing a computing device to:

automatically classify geometry of surfaces and objects within a real-world environment in response to environmental information received from one or more scanning devices;

receive a set of virtual objects comprising virtual object characteristics and including semantic and geometric constraints relating to the virtual objects;

perform two or more iterations to iteratively jointly optimize a layout of an automatically selected variable subset of at least two of the virtual objects selected for each iteration relative to a scene-specific cost function that scores each iteration of the jointly optimized layout based on the characteristics and constraints of the subset of virtual objects relative to the geometry of surfaces and objects within the real-world environment;

wherein each iteration of jointly optimized layout of the subset of virtual objects comprises a different trial solution of a joint layout of all of the virtual objects of the automatically selected variable subset of virtual objects;

wherein each iteration is consistent with the geometry of surfaces and objects within the real-world environment;

render the iteratively jointly optimized layout of virtual objects to generate a tactile virtual reality (TVR) that is anchored to the real-world environment in a way that at least partially matches tactile truth for one or more surfaces and objects within the real-world environment; and replace a view of the real-world environment around one or more users by displaying the TVR via an immersive display device.

20. The computer-readable storage device of claim 19 further comprising dynamically performing real-time updates to the TVR in response to any user interactions with any virtual objects in the TVR and any real objects within the real-world environment corresponding to the TVR.

* * * * *